(12) United States Patent  (10) Patent No.: US 8,542,693 B2
Soni et al.  (45) Date of Patent: Sep. 24, 2013

(54) MANAGING FREE PACKET DESCRIPTORS IN PACKET-BASED COMMUNICATIONS

(75) Inventors: Maneesh Soni, Dallas, TX (US); Brian J. Karguth, Van Alstyne, TX (US); Michael A. Denio, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/181,831

(22) Filed: Jul. 29, 2008

(65) Prior Publication Data

US 2009/0034549 A1 Feb. 5, 2009

Related U.S. Application Data

(60) Provisional application No. 60/953,279, filed on Aug. 1, 2007.

(51) Int. Cl.
 *H04L 12/28* (2006.01)
(52) U.S. Cl.
 USPC .......................................................... 370/412
(58) Field of Classification Search
 USPC ................. 370/235, 349, 354, 363, 389, 412, 370/471, 473, 474
 See application file for complete search history.

(56) References Cited

U.S. PATENT DOCUMENTS

| | | | |
|---|---|---|---|
| 6,480,489 B1* | 11/2002 | Muller et al. | 370/389 |
| 2004/0095882 A1* | 5/2004 | Hamzah et al. | 370/229 |
| 2005/0147038 A1* | 7/2005 | Chandra et al. | 370/235 |
| 2009/0034549 A1* | 2/2009 | Soni et al. | 370/412 |

* cited by examiner

*Primary Examiner* — Andrew Lai
*Assistant Examiner* — Leon Andrews
(74) *Attorney, Agent, or Firm* — Steven A. Shaw; W. James Brady; Frederick J. Telecky, Jr.

(57) ABSTRACT

A network element including a processor with logic for managing packet queues including a queue of free packet descriptors. Upon the transmission of a packet by a host application, the packet descriptor for the transmitted packet is added to the free packet descriptor queue. If the new free packet descriptor resides in on-chip memory, relative to queue manager logic, it is added to the head of the free packet descriptor queue; if the new free packet descriptor resides in external memory, it is added to the tail of the free packet descriptor queue. Upon a packet descriptor being requested to be associated with valid data to be added to an active packet queue, the queue manager logic pops the packet descriptor currently at the head of the free descriptor queue. Packet descriptors in on-chip memory are preferentially used relative to packet descriptors in external memory.

20 Claims, 12 Drawing Sheets

| HEAD INDEX | TAIL INDEX | NUMBER OF ENTRIES IN QUEUE | TOTAL # OF BYTES IN QUEUE | HEAD PACKET DESCRIPTOR SIZE | HEAD PACKET SIZE | $42_j$ |

| PACKET SIZE | PACKET DESCRIPTOR SIZE | NEXT DESCRIPTOR INDEX | $30_i$ |

| HEAD/TAIL (w) | DESCRIPTOR POINTER (rw) | HEAD PACKET DESCRIPTOR SIZE (rw) | TOTAL # OF BYTES IN QUEUE (r) | NUMBER OF ENTRIES IN QUEUE (r) | $45_k$ |

| HEAD INDEX | TAIL INDEX | NUMBER OF ENTRIES IN QUEUE | TOTAL # OF BYTES IN QUEUE | HEAD PACKET DESCRIPTOR SIZE | HEAD PACKET SIZE |
|---|---|---|---|---|---|
| 2 | 67 | 4 | 20480 | 32 | 4096 |

$42_0$

| HEAD INDEX | TAIL INDEX | NUMBER OF ENTRIES IN QUEUE | TOTAL # OF BYTES IN QUEUE | HEAD PACKET DESCRIPTOR SIZE | HEAD PACKET SIZE |
|---|---|---|---|---|---|
| 3 | 67 | 5 | 28672 | 32 | 8192 |

$42_0$

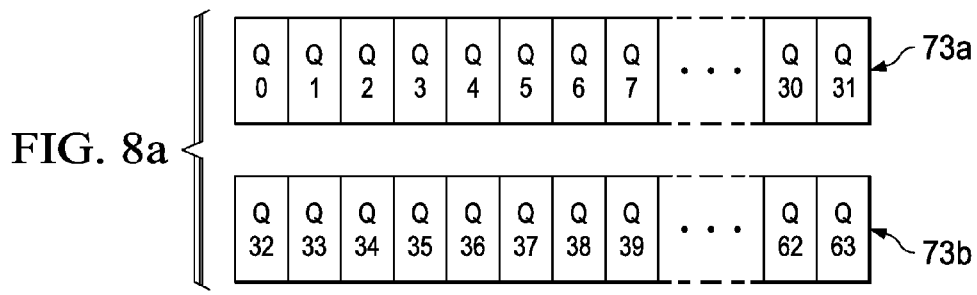
FIG. 8a
| NUMBER OF ENTRIES IN QUEUE | TOTAL # OF BYTES IN QUEUE | HEAD PACKET DESCRIPTOR SIZE | HEAD PACKET SIZE |
|---|---|---|---|
| 4 | 20480 | 32 | 4096 |
$75_k$
FIG. 8b
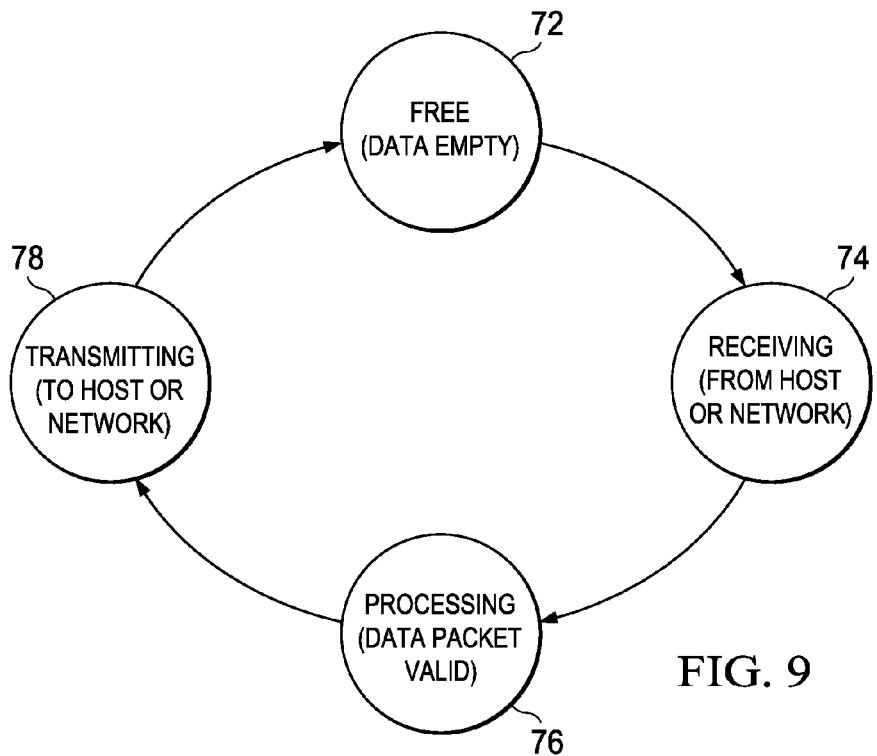
FIG. 9

MANAGING FREE PACKET DESCRIPTORS IN PACKET-BASED COMMUNICATIONS

CROSS-REFERENCE TO RELATED APPLICATIONS

This application claims priority, under 35 U.S.C. §119(e), of Provisional Application No. 60/953,279, filed Aug. 1, 2007, incorporated herein by this reference. This application is related to application Ser. No. 12/181,802, now U.S. Pat. No. 8,059,670 B2 issued on Nov. 15, 2011, entitled "Hardware Queue Management with Distributed Linking Information", commonly assigned with this application and filed on the same day as this application.

STATEMENT REGARDING FEDERALLY SPONSORED RESEARCH OR DEVELOPMENT

Not applicable.

BACKGROUND OF THE INVENTION

This invention is in the field of data communications, and is more specifically directed to the management of data communications in a digital system.

Digital data communications has become an ever-increasing function of modern digital systems, as a result of the vast improvements in communications technology over recent years. Data communications functionality can now be realized in virtually every digital system, ranging from miniature hand-held devices such as cameras and digital audio players, to large-scale computer systems, servers, and web hosting facilities. The manner in which such communications is carried out varies, of course, with the particular communications technology being used. Computer systems connected into a local area network (LAN) include Ethernet adapters for wired network communications, or wireless adapters such as those operating according to the well-known IEEE 802.11a/b/g/n standards. Cable or Digital Subscriber Line (DSL) modems provide communications between computers and networks, on one hand, and telephone or cable communications service providers, on the other hand, according to the applicable standard. Digital set-top boxes provide digital communications between home entertainment systems and cable or satellite television and communications service providers. Wireless telephone service providers operate base stations deployed throughout cities and rural areas, each of which manage and support communications with wireless telephone handsets and network devices (e.g., broadband wireless network cards for laptop computers).

Much of modern digital communications communicate digital data between nodes or elements in a network in the form of "packets". In this approach, the payload data are subdivided into discrete blocks of data ("packets") which are individually routed over the data network, typically along with other packets being communicated between other source and destination nodes. Packet communications may be point-to-point, in which the source and destination nodes are in direct communication with one another, or carried out in a packet switching environment, in which the packets in a given message or communication are communicated through intermediate nodes, and often over different logical data streams. At the intermediate nodes, in this context, each packet is typically queued and buffered at each network node along the overall data path between source and destination. A wide range of communications services utilize packet-based communications, including Ethernet, Internet Protocol (IP), frame relay communications, Asynchronous Transfer Mode (ATM), and the like.

Fundamentally, packets include a descriptor and an associated data element. The descriptor includes information such as the current location of the data element in memory, the size of the data element, and other identifying and control information. A communications message consisting of multiple packets is conventionally managed by way of a "linked list", in which the descriptor for a given packet includes a memory address pointing to the location of the descriptor of the next packet in sequence within the message. The communications device or system transmitting or receiving the message thus processes a packet, with its descriptor and data element, and then next processes the packet to which the descriptor of the previous packet points.

FIG. 1 illustrates, in block form, the arrangement of a network adapter, in a digital system, as it carries out the communication of a multiple-packet message using a linked list. In the arrangement of FIG. 1, this network adapter includes Ethernet driver 2, which manages the communication of data to and from an external Ethernet network in this example. Ethernet driver 2 manages this communication by way of a linked list of data packets. For the example of transmission by Ethernet driver 2, each data packet will be transmitted as the payload of its own communications packet, along with the appropriate header information for the particular network protocol. The complete message is thus transmitted as a sequence of individual packets, which may be interspersed with packets from other messages. The destination of the message will then resequence the packets into the overall message.

In the arrangement of FIG. 1, physical memory resources 6a, 6b store data packets 8 and their corresponding descriptors 4. In this network adapter, as is typical for conventional network adapters, memory resource 6a is realized by "on-chip" memory that is local to the central processing unit and other programmable logic carrying out the function of the network adapter, while memory resource 6b is realized as "off-chip" memory external to that programmable logic. In each case, memory resources 6a, 6b are typically random access memory. The external "off-chip" memory resource 6b is provided to reduce the cost of the local programmable logic of the network adapter, and can provide a relatively large memory capacity to the adapter. However, accesses to external memory resource 6b are necessarily slower than accesses to on-chip memory resource 6a, due to differences in the access times of the memories themselves, as well as the control overhead required to access external memory.

In this conventional arrangement of a network adapter shown in FIG. 1, two functions operate on communications packets stored in memory resources 6a, 6b. As mentioned above, one of these functions is Ethernet driver 2, which manages the transmission of data packets stored in memory resources 6a, 6b to the network, and which manages the receipt of data packets from the network and their storage in memory resources 6a, 6b. In addition, this conventional network adapter is also in communication with host application 10, which generates and places data packets that are to be transmitted over the network into memory resources 6a, 6b, and which retrieves data packets received over the network from memory resources 6a, 6b for further processing according to the particular application and host system.

In conventional packet-based network communications, management and processing of data packets 8 in the form of a "linked list", representing a queue that is maintained at a network processing point, has proven to be useful. This concept is applied at the network processing point, such as within a network adapter, in converting an incoming stream of data packets (whether being transmitted or received over the network) into a linked list of descriptors, and buffers associated with those descriptors. FIG. 1 illustrates how a typical linked list of data packets 8 is maintained in such a conventional network adapter. Each data packet 8 has a corresponding descriptor 4 that is also stored somewhere in memory resources 6a, 6b. The size of a given descriptor 4 can vary from a few bytes to several kilobytes, depending on the protocol and the particular type of packet, with packet descriptors of multiple sizes are often simultaneously managed within a conventional network adapter. In the arrangement of FIG. 1, as is typical, each descriptor 4 includes information regarding its associated data packet 8, including its size and memory location. The applicable network protocol standard typically defines the structure and contents of descriptors 4, as known in the art.

To implement the queue as a linked list, each descriptor 4 includes a "next" pointer, which is the memory location of the descriptor 4 that is next in the transmission (or receipt) queue. In the example of FIG. 1, descriptor 4(n) includes a next pointer that is storing the memory address, in memory resource 6a, of descriptor 4(n+1). Similarly, descriptor 4(n+1) includes a next pointer storing the memory address of descriptor 4(n+2), and descriptor 4(n+2) includes a next pointer storing the memory address of descriptor 4(n+3). In this manner, the linked list is established by each descriptor 4 identifying the next descriptor 4 in the sequence. As evident from FIG. 1 and as conventional in the art, each descriptor 4(n) through 4(n+3) also stores the memory address of its corresponding data packet 8(n) through 8(n+3), respectively, as well as other information regarding that data packet 8. The data packets 8 need not reside in the same memory resource 6a, 6b as its corresponding descriptor 4. For example, data packet 8(n+1) is stored in external memory resource 6b, while its associated descriptor 4(n+1) is stored in on-chip memory resource 6a.

It has been observed, in connection with this invention, that the conventional arrangement of FIG. 1 limits performance in several ways. As discussed above, access to those descriptors 4 that are stored in external memory resource 6b can be relatively slow as compared with access to descriptors 4 in on-chip memory resource 6a. But because the memory requirements of descriptors 4 necessitate such storage in both on-chip and off-chip memory, the overall performance of the network adapter in queue management (e.g., writing or retrieving the contents of the next pointers as a packet is added to the queue) can suffer. In addition, the arrangement of FIG. 1 is vulnerable to data coherency problems, given the separate access to memory resources 6a, 6b by host application 10 and Ethernet driver 2, each of which is managing one or more transmission or receipt queues, independently from the other.

In the conventional arrangement described above relative to FIG. 1, a list or "pool" of free descriptors is maintained, to permit the network adapter to define new packets (i.e., packet descriptor and its associated data packet) for data to be transmitted or newly received data. In this example, host application 10 and Ethernet driver 2 each have access to this free descriptor pool, which is essentially a linked list queue of these descriptors. As noted above, on-chip memory resources 6a are typically not of adequate size to store all of the packet descriptors 4 that are available for use; indeed, it is contemplated that external memory resource 6b will commonly store a significant number of packet descriptors 4. As a result, selection of a free descriptor upon receipt or transmission of a new packet will often select a free descriptor in external memory resource 6b rather than from on-chip memory resource 6a, which necessarily involves a performance penalty due to the increased latency of accesses to external memory.

BRIEF SUMMARY OF THE INVENTION

It is therefore an object of this invention to provide a network adapter architecture and method of operating the same that improves the performance of queue management, particularly in the assignment of packet descriptors in memory.

It is a further object of this invention to provide such an architecture and method in which accesses to external memory resources are minimized in the selection of packet descriptors in memory.

It is a further object of this invention to provide such a such an architecture and method in which data coherency and queue management is streamlined.

Other objects and advantages of this invention will be apparent to those of ordinary skill in the art having reference to the following specification together with its drawings.

The present invention may be implemented into a network adapter including queue management logic. The queue management logic communicates with various host applications or functions that provide or receive data packets to or from a queue of data packets. The queue management logic maintains, for each queue, a queue register that stores indices to descriptors. One of the queues serves as a free packet descriptor queue, identifying packet descriptors that are not associated with an active queue and which are thus free for use with new packets. Upon a packet descriptor becoming free, queue management logic appends that packet descriptor to the head of the free descriptor queue if the packet descriptor resides in on-chip memory, and appends that packet descriptor to the tail of the free descriptor queue if it resides in external memory. Packet descriptors are taken from the head of the free descriptor queue upon assignment to a host application for use in transmitting a packet. This arrangement maximizes the use of on-chip packet descriptor memory resources, as external packet descriptors are used only if no free on-chip packet descriptors remain in the free descriptor queue.

BRIEF DESCRIPTION OF THE SEVERAL
VIEWS OF THE DRAWING

FIGS. 8a and 8b illustrate the arrangement of the contents of queue pending registers and a queue status register, respectively, according to an embodiment of the invention.

FIG. 9 is a state diagram illustrating the transition of states of a packet descriptor, in the queue management architecture of an embodiment of the invention.

DETAILED DESCRIPTION OF THE INVENTION

The present invention will be described in connection with one of its embodiments, namely as implemented into a cable modem gateway system. This particular embodiment of the invention is presented in this description because it is contemplated that this invention is especially beneficial in such an application. However, it is also contemplated that this invention is similarly beneficial when applied to other system applications, examples of which include as base stations for wireless telephony, set-top boxes in a cable or satellite entertainment system, and network adapters according to other communications technologies. In addition, it is contemplated that this invention can be useful in other communications applications, including inter-process communications between two or more threads in one or more concurrent computing processes. Accordingly, it is to be understood that the following description is provided by way of example only, and is not intended to limit the true scope of this invention as claimed.

Figure 1:
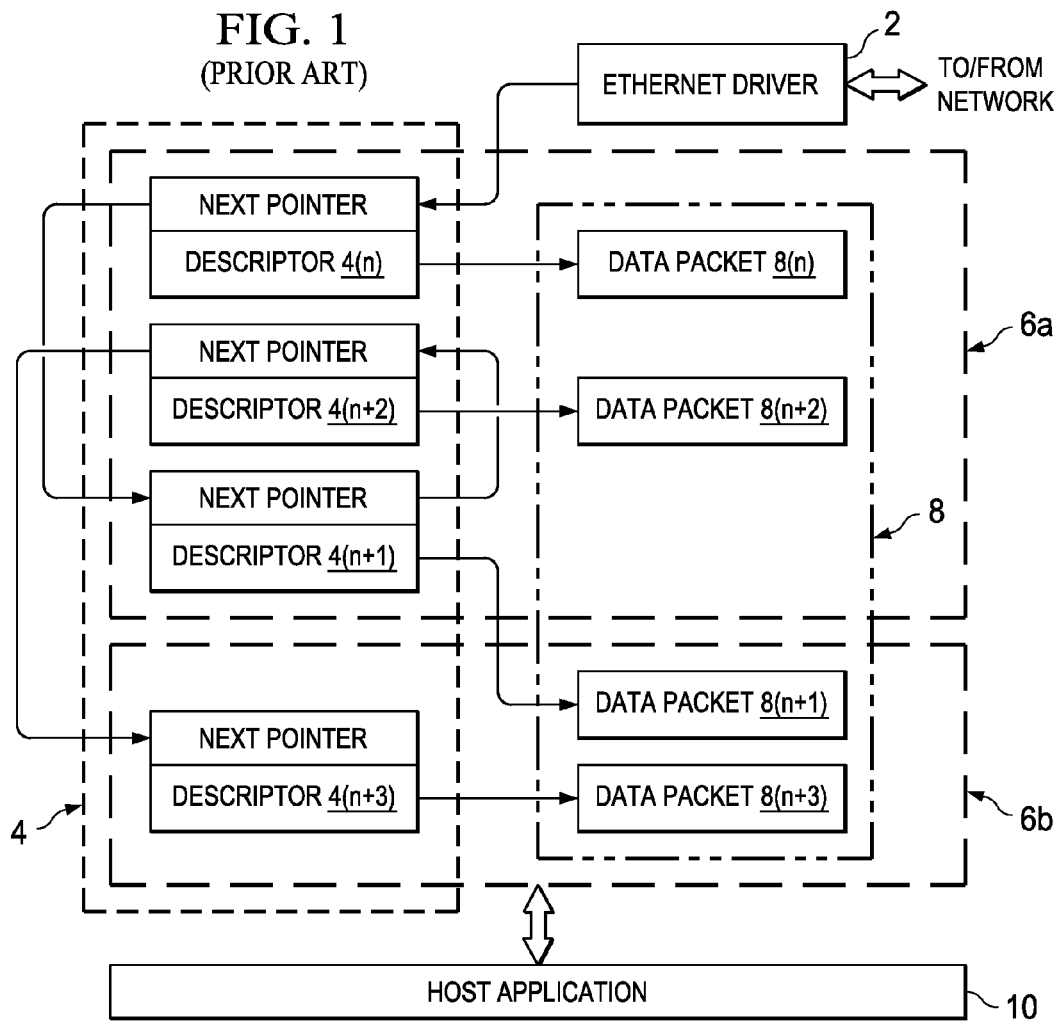
FIG. 1 is a functional diagram, in block form, of an architecture of a conventional network adapter.
Figure 2:
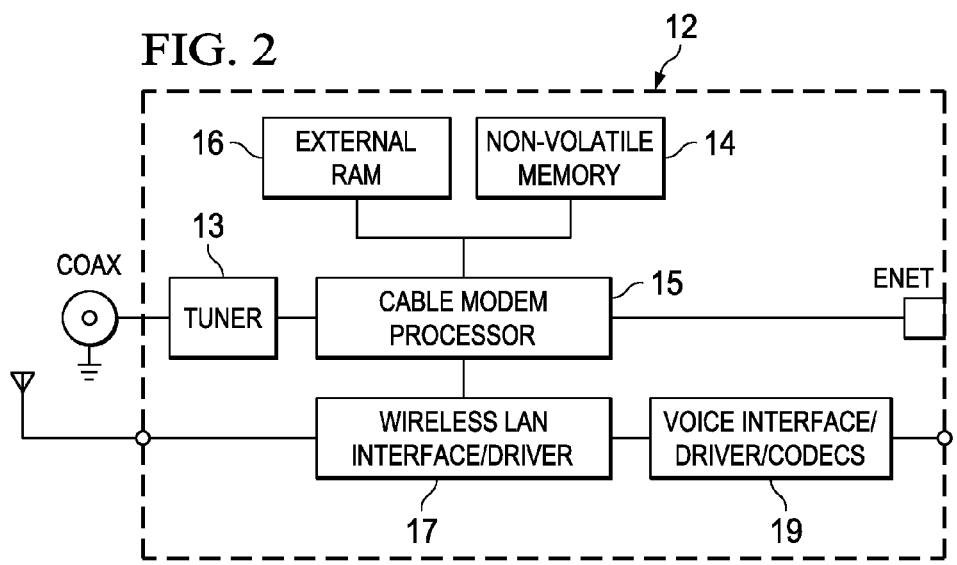
FIG. 2 is an electrical diagram, in block form, of a cable modem gateway system constructed according to an embodiment of the invention.

FIG. 2 illustrates, by way of example, an overall architecture of cable modem gateway 12 incorporating an embodiment of this invention. As known in the art, cable modem gateway 12 supports one or more communications technologies for a home or other customer premises, managing such services as cable Internet service, wireless or wired local area network (LAN) within the premises, and Voice over Internet Protocol (VoIP) service. In this architecture, cable modem gateway 12 includes cable modem processor 15, which is a programmable processor with sufficient processing power to manage these multiple services. Examples of such programmable logic with such processing capability include the TNETC460x and TNETC4700 families of cable modem chips available from Texas Instruments Incorporated. For example, cable modem processor 15 can include a MIPS RISC processor core, and also digital signal processing capability such as provided by the TMS320C55x digital signal processors available from Texas Instruments Incorporated. According to this embodiment of the invention, cable modem processor 15 also includes queue management logic and functionality, which will be described in further detail below.

In the architecture of cable modem gateway 12 shown in FIG. 2, cable modem processor 15 receives and transmits signal to and from the cable service provider "head-end" facility via tuner 13, which in turn is connected to coaxial cable interface COAX as shown. Communications via tuner 13 and interface COAX constitute those communications external to the premises at which cable modem gateway 12 is installed. For communications within those customer premises, in this example, cable modem processor 15 is coupled to wireless LAN interface/driver function 17, which in turn is coupled to one or more antennae A from which wireless LAN communications are transmitted and received. VoIP communications are also managed by cable modem processor, via voice interface/driver/codecs function 19, implemented in the conventional manner for such communications. Cable modem processor 15 itself is coupled to an Ethernet interface ENET, and manages the packet-based communications of data to and from other network elements at the premises, on one hand, and upstream or wide-area network (WAN) services via tuner 13 and interface COAX.

Cable modem processor 15 operates as a programmable logic device, and as such includes memory resources internally thereto ("on-chip" memory), as well as resources and capability to access external ("off-chip") memory. In the architecture of FIG. 2, such external memory resources include non-volatile memory 14, for example realized as "flash" memory, or by way of another read/write or read-only programmable read-only memory technology. Cable modem processor 15 is also coupled to external random-access memory (RAM) 16. External RAM 16 may be realized by way of static RAM, dynamic RAM, or such other memory technology that provides significant storage capacity at reasonable cost and access time performance. As will become evident from the following description, external RAM 16 is used to store packet descriptors and also packet data, in the operation of this embodiment of the invention.

The particular architecture illustrated in FIG. 2, for the example of cable modem gateway 12, is provided merely by way of example, and to provide some context for the embodiment of the invention described in this specification. As mentioned above, it is contemplated that this invention, and indeed this particular embodiment of this invention, can be realized in other network adapters and systems, and in such other applications as well as in realizing a cable modem gateway, it is contemplated that the architecture of such systems can vary significantly from that shown in FIG. 2. It is contemplated that those skilled in the art having reference to this specification can readily implement this invention in such variations and other applications and architectures, without undue experimentation.

Figure 3:
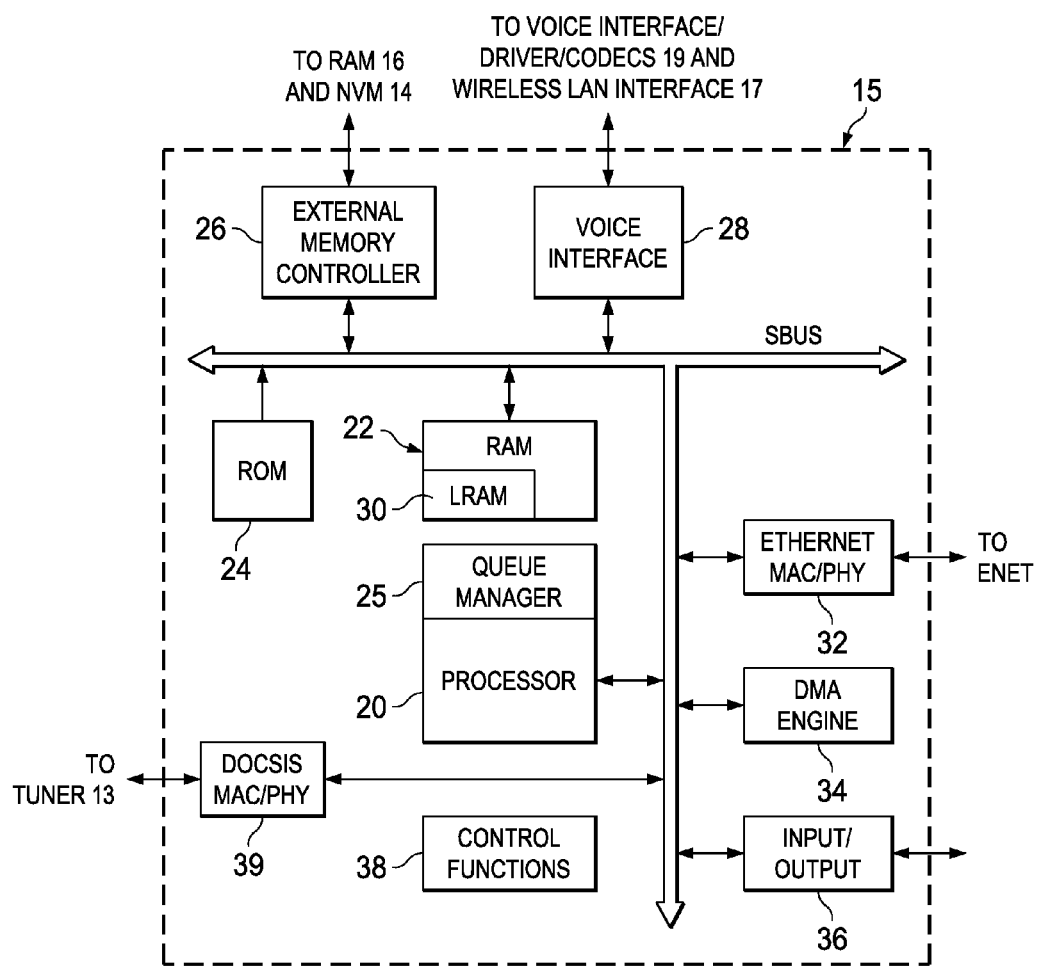
FIG. 3 is an electrical diagram, in block form, of a cable modem processor in the cable modem gateway system of FIG. 2, according to that embodiment of the invention.

FIG. 3 illustrates, in further detail, an example of the architecture of cable modem processor 15 according to this embodiment of the invention. The particular architecture illustrated in FIG. 3 and described herein is, again, presented only by way of example. It is contemplated that a wide array of architectures can realize the functions and operation of processor 15, and that those skilled in the art having reference to this specification can readily use such alternative architectures in that regard. As such, the architecture illustrated in FIG. 3 is presented by way of example only, and is not intended to be limiting in scope.

Cable modem processor 15 includes processor 20, which as mentioned above, may be realized by way of a relatively high-performance microprocessor or digital signal processor core (or both), examples of which include a MIPS RISC processor core, and a digital signal processor core such as the TMS320C55x DSP. According to this embodiment of the invention, processor 20 realizes queue manager function 25, either by way of custom or semi-custom hardware, or by way of software. Queue manager 25 carries out the management of packet queues according to this embodiment of the invention, as will be described below. In this regard, queue manager 25 includes sufficient arithmetic and logic resources, register locations, and the like sufficient to perform these queue management functions, again either by way of dedicated resources or by sharing resources with other functions carried out by processor 20.

In the architecture illustrated in FIG. 3, processor 20 communicates with its memory resources and other system functions by way of system bus SBUS. The memory resources realized within cable modem processor 15 include RAM 22 and read-only memory (ROM) 24, both of which are coupled to system bus SBUS. ROM 24 may be realized by way of conventional mask-programmable or electrically-programmable non-volatile memory. By virtue of its non-volatility, ROM 24 is well suited for use, at least in part, as program memory for processor 20, in which case it will store program instructions that are executable by processor 20. RAM 22 may be realized as relatively high-speed random access memory, for example as static or dynamic RAM as appropriate for the technology of cable modem processor 15. As such, it is contemplated that RAM 22 will typically be used, in part, as data memory involved in the operation of processor 20 according to this embodiment of the invention.

System bus SBUS is also coupled to external memory controller 26, by way of which processor 20 can communicate with external memory including non-volatile memory 14 and external RAM 16 (FIG. 2). As typical in the art, the speed and data rate at which processor 20 can access memory locations in RAM 22 and ROM 24 are much faster than the speed and data rate at which processor 20 can access external RAM 16 and non-volatile memory 14 via external memory controller 26. This differential in access performance between on-chip RAM 22 and external RAM 16 is contemplated in the arrangement and operation of processor 20 including queue manager 25, as will become apparent in the following description. It is contemplated that either or both of on-chip ROM 24 and external non-volatile memory 14 may store the program instructions according to which processor 20, and queue manager 25, execute and carry out the operations of this embodiment of the invention as will be described in further detail below. It is left to those skilled in the art having reference to this description to determine the optimum storage location for such program instructions, to the extent realized in software.

According to this embodiment of the invention, on-chip RAM 22 includes a portion of its memory space used as linking RAM 30. Linking RAM 30, as will be described in further detail below, will operate to minimize the number and frequency of accesses by processor 20 to external RAM 16 in managing packet queues, and as a result will improve the performance of queue management in the transmission and receipt of data packets.

Cable modem processor 15 also includes other logic, circuit, and operational functions useful in carrying out its function within cable modem gateway system 12. In this regard, voice interface function 28 is included within cable modem processor 15 and is coupled to system bus SBUS for communication with processor 20. Voice interface function 28 is connected externally to voice interface/driver/codecs 19 and to wireless LAN interface 17 (FIG. 2), and thus serves as a high-speed serial interface to those functions as appropriate for implementing VoIP service, and wireless LAN communications. Ethernet MAC/PHY function 32, coupled to system bus SBUS, carries out media access control and physical layer interfacing with the external Ethernet port of cable modem gateway 12, and thus communicating with computer workstations and other network elements over a conventional wired Ethernet network. DOCSIS MAC/PHY function 39 is also connected to system bus SBUS, and is externally connected to tuner 13 to provide the appropriate physical layer interface, and media access control, for receiving and transmitting signals from and to the coaxial facility external to the premises. DMA engine 34 is optionally provided within cable modem processor 15 to manage direct memory access transactions, for example between external RAM 16 and on-chip RAM 22, in the conventional manner. Various input/output devices 36 are also provided as desired for the particular application, including such interfaces as one or more USB ports, general purpose input/output (GPIO) ports, I$^2$C interfacing, universal asynchronous receiver/transmitter (UART) interfacing, and the like. Control functions 38 provided within cable modem processor 15 include other circuit functions useful in its operation, such functions including an interrupt controller, timer, packet accelerator, JTAG test interface, and the like.

It is contemplated that cable modem processor 15 will be realized by way of a single integrated circuit device, for purposes of cost reduction and performance improvement. Of course, it is not essential that all functions shown as realized by cable modem processor 15 be implemented in the same integrated circuit device. For example, it is contemplated that some of the peripheral functions can be realized by one or more external integrated circuits. In order to attain optimal performance, however, it is preferred that processor 20, including queue manager 25, and at least a portion of linking RAM 30 be realized in the same integrated circuit as one another.

Figure 4:
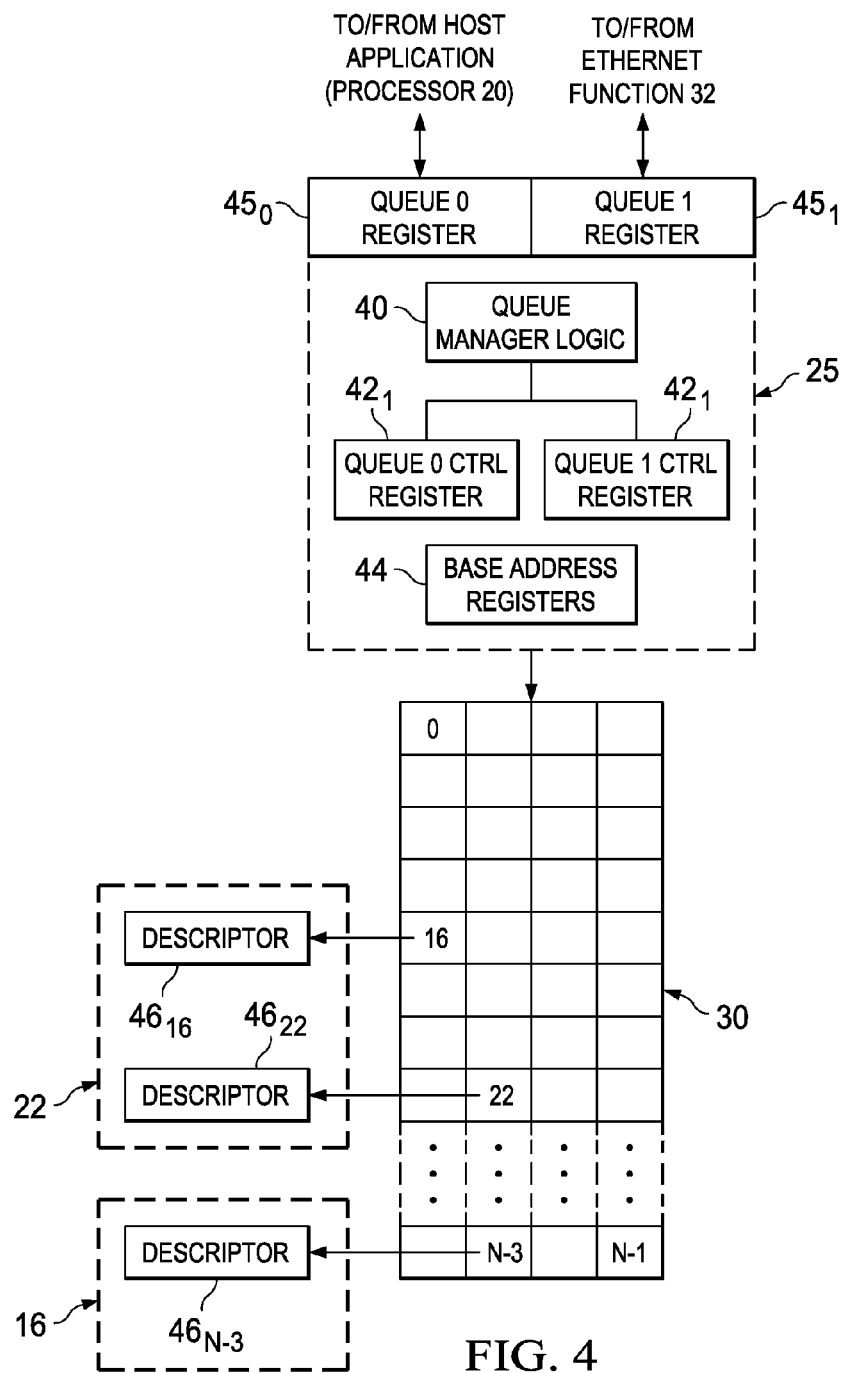
FIG. 4 is a functional diagram, in block form, of a queue management architecture carried out by the processor of FIG. 3, according to that embodiment of the invention.

Referring now to FIG. 4, the functional architecture of the packet queue management by cable modem processor 15 according to this embodiment of the invention will now be described in further detail. As shown in FIG. 4, queue manager 25 includes queue manager logic 40, in combination with various registers 42, 44, 45. Queue manager logic 40 processes push (enqueue) or pop (dequeue) requests received from various "hosts", such as Ethernet function 32, one of the other input/output interfaces in cable modem gateway 12 (e.g., USB interface, serial interface, etc.), or processor 20 itself. These hosts, or more generally host applications, make the appropriate requests by read and write accesses to the one of queue registers 45 corresponding to the desired queue with certain control and address information, as will be described below.

In response to requests from the host applications, queue manager 25 manages the corresponding queue to make the requested addition or deletion to that queue. As such, queue manager logic 40 resolves potential contentions or incoherencies in the queues that may arise from competing requests from these hosts. Queue manager logic 40 may be realized by way of dedicated logic hardware, by general purpose programmable logic executing instructions corresponding to these tasks, or by such other functionality for performing the functions described herein, as will also be apparent to those skilled in the art having reference to this specification.

In this embodiment of the invention, multiple packet queues may be maintained by queue manager 25. Each queue is managed by a corresponding queue control register 42 that are managed by queue manager 25. In the example shown in FIG. 4, two queues (queue #0 and queue #1) are managed by queue manager 25, and as such two queue control registers $42_0$, $42_1$ are present in queue manager 25. Similarly, two queue registers $45_0$, $45_1$ are present in queue manager 25 (or, alternatively, in a register file of processor 20), one for each of the two available queues #0 and #1, and to which the host applications write control and address information. Queue registers $45_0$, $45_1$ may not be actually physical registers, but may be instead realized as specific read/write "addresses" that are acceptable to functions external to queue manager 25, but that in fact serve as inputs to and outputs from queue manager logic 40. More than two queues may be managed by queue manager 25 if so configured; for example, it is contemplated that the number of queues managed, and thus the number of queue control registers 42 and corresponding queue registers 45 may be in the hundreds or in the thousands, in a typical installation. Queue manager 44 also includes a number of base address registers 44, one for each queue, that are used to resolve the memory address of a packet descriptor into a descriptor index, as will be described in further detail below.

Preferably, queue control registers 42, and base address registers 44, are all implemented in memory locations that are internal to queue manager 25. To the extent that these registers are accessible to host applications or other external elements, read and write access is under the control of queue manager logic 40 within queue manager 25. As mentioned above, these accesses can be managed by way of a "mailbox" architecture within queue manager 25, for example by way of queue registers 45 realized as inputs and outputs that are available to host applications, in combination with a "ready" signal that can be polled or otherwise sensed by the host applications. Other architectures may, of course, alternatively be used to configure queue manager 25 as desired and appropriate.

Also according to this embodiment of the invention, linking RAM 30 is provided as discussed above. For best performance, linking RAM 30 is deployed at least in part as a region within on-chip RAM 22, as shown in FIG. 3. It will be apparent to those skilled in the art having reference to this specification that the necessary size of linking RAM 30 is relatively modest. As such, it is contemplated that the realization of linking RAM 30 within on-chip RAM 22 will generally be feasible, especially considering the performance resulting from such implementation. If additional memory space is necessary for linking RAM 30, however, linking RAM 30 may alternatively be realized in whole or in part in external RAM 16.

In this embodiment of the invention, certain regions of the overall memory space available to processor 20 are assigned for potential use as packet descriptors 46. Each potential packet descriptor 46 is associated with an entry within linking RAM 30, and each entry within linking RAM 30 is associated with a descriptor index value; conversely, the memory address of each potential packet descriptor 46 can be resolved into a descriptor index.

FIG. 4 illustrates examples of the association between linking RAM 30 entries, associated descriptor index values, and potential packet descriptors 46 in memory. In this example, N potential packet descriptors are available in the system memory space (including both on-chip RAM 22 and external RAM 16). The first entry in linking RAM 30 is associated with descriptor index 0, while the last entry is associated with descriptor index N-1. In this example, the entry in linking RAM 30 associated with descriptor index 16 is associated with packet descriptor $46_{16}$, and the entry associated with descriptor index 22 is associated with packet descriptor $46_{22}$, both descriptors $46_{16}$, $46_{22}$ residing in on-chip RAM 22. Packet descriptor $46_{N-3}$ resides in external RAM 16, and is associated with the entry in linking RAM 30 associated with descriptor index N-3. As evident from this description, the number of bits necessary to specify a descriptor index value (i.e., the next descriptor index value) is substantially less than the number of bits required to specify a memory address for the descriptor (i.e., the memory address of the next descriptor in the queue). That results from the descriptor index being limited to the number N of potential descriptors in the system, such that the number of bits necessary for the descriptor index value is $\log_2(N)$, rounded up. For example, if 512 descriptors are available, nine bits will be sufficient for a descriptor index value. Conversely, the descriptor pointer or memory address requires at least a substantial portion of the full memory address, which can range up to thirty-two bits in size (for a 4 Gbyte memory space). Accordingly, linking RAM 30 can be modest in size, and as such is well-suited to be realized, if not entirely at least in large part, in on-chip RAM 22.

Figures 5A, 5B, 5C, 5D:
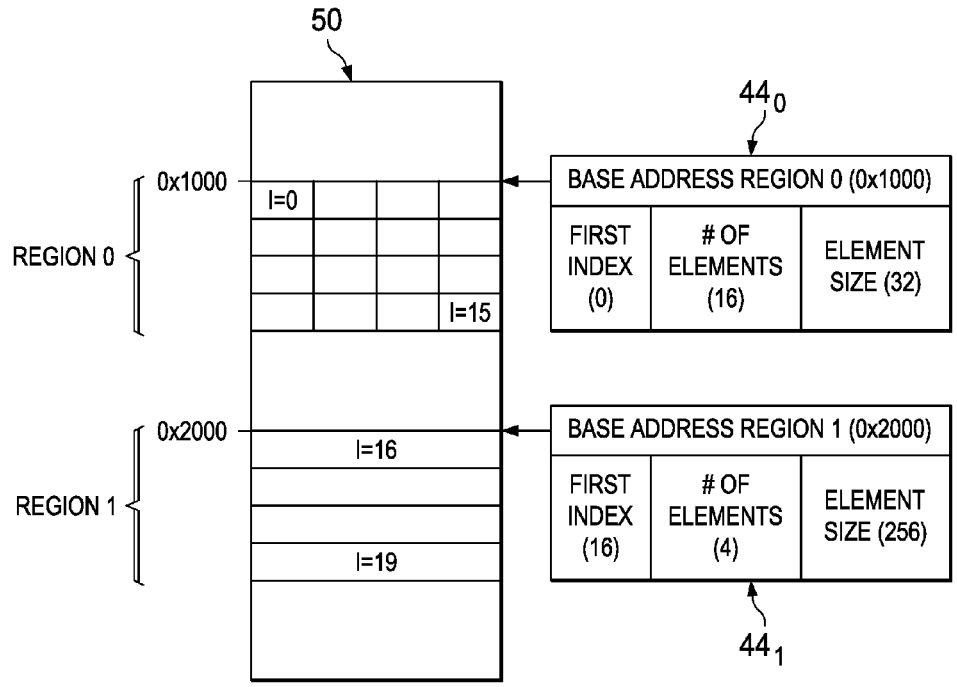
FIGS. 5a through 5d illustrate the arrangement of the contents of a queue control register, a linking memory entry, base address registers, and a queue register, as managed by the architecture of FIG. 4 according to that embodiment of the invention.

As mentioned above, packet queues are managed by queue manager 25 using queue control registers 42, each of which controls a corresponding queue. FIG. 5a illustrates contents of queue control register $42_j$, for a $j^{th}$ queue, by way of example. A first entry contains the descriptor index value of the "head" descriptor in the corresponding queue, while another entry contains the descriptor index value of the "tail" descriptor in that queue. A third entry indicates the number of entries in the queue. As will become apparent from the following description, linking RAM 30 implements the linking between successive descriptors in the queue. As such, queue control register $42_j$ need not store the descriptor indices of each item in the queue, but only need store the head descriptor index, which points to the entry in linking RAM 30 at which the queue is to start. Storage of an indication of the number of entries in the queue is helpful, especially in determining whether the queue is empty; in addition, the tail descriptor index value stored in queue control register $42_j$ enables the appending of packets to either the head or the tail of the queue.

Queue control register $42_j$ may also store other optional information regarding the queue. In this example shown in FIG. 5a, queue control register $42_j$ stores the total number of bytes in the queue (i.e., the total number of data packet bytes in the queue), the size of the packet descriptor 46 at the head of the queue, and the size of the data packet associated with that packet descriptor 46 at the head of the queue. Other information may additionally or alternatively be stored within queue control register $42_j$. Depending on the number and bit widths of the various fields within queue control register $42_j$, it may be useful to realize queue control registers $42_j$ as multiple sub-registers associated with a given queue, with each sub-register readable or writable via a corresponding field (or sub-register) of an associated queue register $45_j$ (via a "mailbox", as mentioned above).

FIG. 5b illustrates the contents of an entry $30_i$ in linking RAM 30, according to this embodiment of the invention. As described above, the descriptor index value associated with this entry $30_i$ is implicit in its location within linking RAM 30, and as such the descriptor index value need not be explicitly stored within entry $30_i$ itself. According to this embodiment of the invention, the descriptor index value of the next descriptor 46 in the queue containing the descriptor 46 associated with entry $30_i$ is stored within entry $30_i$. This next descriptor index value thus implements the linked list of descriptors 46 in the queue, as each element in the queue points to the next element in that queue. In this example, the size of the data packet associated with the descriptor 46 associated with entry $30_i$ is also stored in entry $30_i$, as is the size of the packet descriptor 46 associated with entry $30_i$. These data packet and packet descriptor sizes are thus available for loading into queue control register $42_j$ when the descriptor 46 associated with this entry $30_i$ reaches the head of its queue.

As mentioned above, the memory address of each potential packet descriptor 46 is resolvable into a descriptor index value. This association results from a mapping of descriptor memory addresses into descriptor index values, using base address registers 46 within queue manager 25, as will now be described relative to FIG. 5c.

FIG. 5c illustrates overall memory space 50, which is inclusive of on-chip RAM 22 and also external RAM 16, as well as such other memory resources as may be available to processor 20. According to this embodiment of the invention, certain regions of this memory space are at least temporarily assigned to packet descriptors 46. In the example of FIG. 5c, two such regions of memory space 50 are shown as within this memory space 50; of course, more regions may be provided as desired by the system implementer. Each region of memory space 50 contains a number of packet descriptors 46. The size of descriptors 46 is constant within a given region, to facilitate mapping of the memory address of a given descriptor 46 to a descriptor index value as used in linking RAM 30. However, different regions can contain packet descriptors 46 of different sizes, as shown in FIG. 5c.

More specifically, in the example of FIG. 5c, region 0 of memory space 50 is mapped to contain sixteen packet descriptors 46. The mapping of this region 0 is described in base address register $44_0$ maintained by queue manager 25. As shown in FIG. 5c, each base address register 44 stores a base memory address for its associated memory region, the value of the descriptor index associated with the first packet descriptor 46 in that region, the number of elements (packet descriptors 46) mapped into that memory region, and the size of each packet descriptor 46 in that region. For the example of region 0 in FIG. 5c, the base address value of 0x1000 (which is at the top of region 0), the first descriptor index value of 0, the number of packet descriptors of sixteen, and the packet descriptor size of 32 bytes, are all stored within base address register $44_0$ in queue manager 25. Region 1 is at a different, and in this case non-contiguous, portion of memory space 50, and indeed may be physically located in a different memory resource (e.g., external vs. on-chip) than region 0. In this example, base register $44_1$ associated with region 1 stores a base address value of 0x2000 (the memory address at the top of region 1), a first descriptor index value of 16 (index values 0 through 15 having been assigned to region 0), a number of packet descriptors of four, and a packet descriptor size of 256 bytes.

According to this embodiment of the invention, therefore, the contents of base address registers 44 enable the memory address of a packet descriptor 46 to be resolved into a one-to-one correspondence with a descriptor index value. For the example of FIG. 5c, the descriptor index value of 17 is associated with memory address 0x2010 (a base address of 0x2000 for Region 1, and the descriptor index value of 17 pointing to the second 256-byte descriptor in that Region 1). In general, this mapping enables linking RAM 30 to accurately link packet descriptors 46 into a linked list within a given queue. Management of packet queues is facilitated as a result, as will now be described in connection with the operation of queue manager 30 according to this embodiment of the invention.

FIG. 5d illustrates an example of queue register $45_k$ by way of which host applications enqueue (push) a packet onto the queue, or dequeue (pop) a packet from the queue. As mentioned above, each queue managed by queue manager 25 has a corresponding queue register $45_k$, which may be a physical register accessible to host applications, or which may instead be realized as an "address" serving as an input and output to queue manager logic 40 (which processes and internally stores the data received from or presented to host applications via the address of queue register $45_k$). As will be evident from the description below, a host application can push a packet onto the queue by writing to queue register $45_k$; in the example of FIG. 5d, this write operation presents head/tail bit indicating whether the packet to be added is to be appended to the head or tail of the queue, and also presents a descriptor pointer that corresponds to the memory address at which the corresponding packet descriptor is stored. Optionally, the host application can also write the data packet size associated with that new packet descriptor into queue register $45_k$, in enqueuing a packet. Conversely, to pop a packet from the head of the $k^{th}$ queue, the host application will request a read of the contents of queue register $45_k$. This read will return the descriptor pointer corresponding to the memory address of the descriptor for the packet to be dequeued, which is the descriptor for the packet at the head of the queue according to this embodiment of the invention, along with the size of the data packet associated with the descriptor at the head of the queue, if desired. Optionally, values indicating the total number of bytes in the queue and the number of entries in the queue can be read from queue register $45_k$ in this pop operation. Depending on the information that is to be maintained, it may be useful to arrange queue register $45_k$ into multiple sub-registers that are associated with a single queue but that can be separately written and read. In such a multiple sub-register arrangement, one or more of the sub-registers can be dedicated to "mandatory" information (such as the descriptor pointer and the size of the associated data packet), with the remaining sub-registers available for optional information.

Figure 6A:
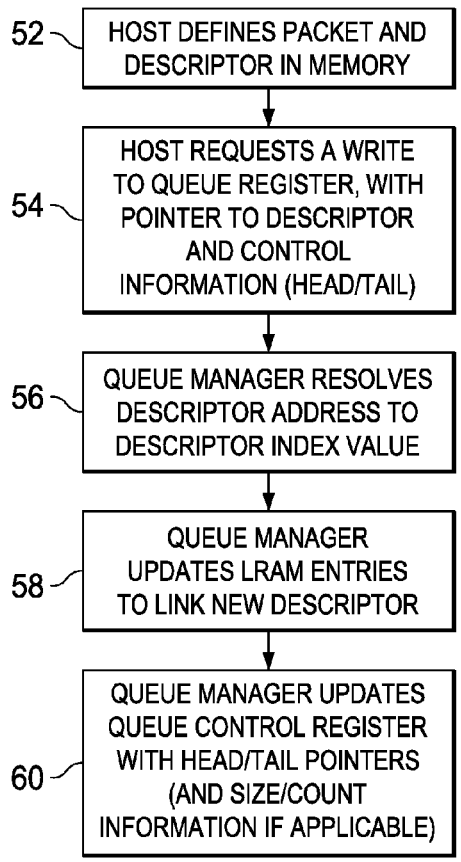
FIGS. 6a and 6b are flow diagrams illustrating the operation of the queue management architecture of FIG. 4, according to that embodiment of the invention.

The operation of queue manager 25 in processor 20 in enqueuing a packet to an existing queue, according to this embodiment of the invention, will now be described in connection with FIG. 6a. A corresponding example of the addition of a packet to a queue and the contents of certain registers and memory locations is illustrated in FIGS. 7a through 7e. The process begins with process 52, in which the host application defines and stores a data packet in memory, either in on-chip RAM 22 or external RAM 16, and in which the host application defines a packet descriptor 46 for that stored data packet. In this process 52, the host application stores that packet descriptor 46 in a location of memory space 50 that is allocated for packet descriptors, for example one of regions 0 and 1 in the example of FIG. 5c. The particular region in which the packet descriptor 46 is stored depends on the necessary size for that descriptor, and does not depend upon the queue in which the packet is to be placed nor necessarily on the location of the corresponding data packet, etc. The packets in a given queue will, of course, generally correspond to the same message or transmission, as known in the art. Once the data packet and its packet descriptor are stored, the host application is ready to enqueue that packet onto a queue managed by queue manager 25.

In process 54, the host application writes control and descriptor information to the appropriate queue register 45 at or accessible to queue manager 25. As discussed above, such write access by a host application to queue register 45 is managed by queue manager logic 40, for example by way of a "mailbox" architecture in this example. According to this embodiment of the invention, this control and descriptor information includes a pointer to the memory location at which the packet descriptor is stored (i.e., a memory address or a value from which the address can be derived), and control information indicating that the host application wishes to place a packet on the queue (as opposed to taking a packet from the queue), and whether this packet is to be appended to the head or to the tail of the queue. Selection of the particular queue to which this packet is to be appended is made by the selection of the queue register $45_0$ or $45_1$ (in this example) to which this information is written. Other control and identifying information may also be written to queue register 45, such optional information including the size of the packet descriptor, and the size of the data packet corresponding to that descriptor.

In process 56, queue manager logic 40 derives a descriptor index value from the descriptor pointer or address provided by the host application in process 54. As discussed above relative to FIG. 5c, memory regions are defined in the overall memory space, into which packet descriptors of a common size (within the region) may be stored. Queue manager logic 40 resolves the descriptor pointer into the descriptor index by reference to base address register 44 associated with the region at which the descriptor pointer or address resides. From the base address value, the first descriptor index, the number of elements, and the element size stored in base address register 44 for that memory region, queue manager logic 40 can resolve a descriptor index value for the packet descriptor of the current request, using rudimentary arithmetic operations.

Once the descriptor index value is determined in process 56, queue manager logic 40 updates linking RAM 30 to link the new packet and packet descriptor into the appropriate queue, in process 58. This update of linking RAM 30 depends on whether the new packet is to be appended to the head of the queue or to the tail of the queue. If the new packet is to be appended to the tail of the queue, queue manager logic 40 will read the descriptor index for the descriptor currently at the tail of the queue will from the tail index field of queue control register $42_0$ (for queue #0). The next descriptor index field of the linking RAM entry $30_i$ descriptor index for that descriptor currently at the tail of the queue will be written with the descriptor index value determined in process 56 for the new packet, to link the new descriptor to the tail of the queue. The linking RAM entry $30_i$ for the new packet will also be written with the data packet size and packet descriptor size (FIG. 5b) of the new packet, if desired for this operation. On the other hand, if the new packet is to be appended to the head of the queue, queue manager logic will read the descriptor index of the descriptor currently at the head of the queue from the head index field of queue control register $42_0$. This descriptor index value pointing to the previous head of the queue will be written into linking RAM entry $30_i$ for this new packet, along with the data packet size and packet descriptor size of the new packet, if desired.

In process 60, queue control register 42 for the queue is updated by queue manager logic 40. In this embodiment of the invention, referring to FIG. 5a, the head descriptor index or tail descriptor index is updated with the descriptor index value for the new packet that is being appended to the queue. The other information currently valid in queue control register 42 (FIG. 5a) may also be updated as appropriate, to store valid data for the number of entries and total number of bytes in the queue, as well as the head packet descriptor size and head data packet size.

Figures 7A, 7B, 7C:
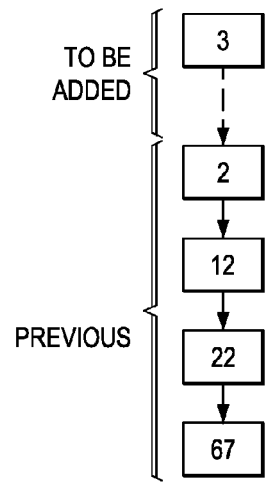
FIGS. 7a through 7e illustrate the operation of the enqueuing process of FIG. 6a, according to that embodiment of the invention, by reference to the contents of the queue register and linking memory.

FIGS. 7a through 7e illustrate an example of the enqueuing of a new packet, with reference to specific values stored in the various registers. In this example, as shown in FIG. 7a, the previous state of queue #0 includes four packets, in the sequence (by descriptor index value) of 2-12-22-67. As such, the descriptor index value for the packet at the head of the queue is 2, and the descriptor index value for the packet at the tail of the queue is 67. These values are reflected in the contents of queue control register $42_0$, along with the number of entries in the queue (4). In this example, three of the descriptors in the queue (namely those associated with descriptor indices 2, 12, 22) are thirty-two byte descriptors, and the fourth descriptor (namely that associated with index 67) is 256 bytes. In this example, the total number of bytes in the queue is 20480 bytes, as indicated in queue control register $42_0$. In this example, the head packet (i.e., having descriptor index 2) has a data packet of 4096 bytes, and a packet descriptor of 32 bytes in size.

Figure 7D:
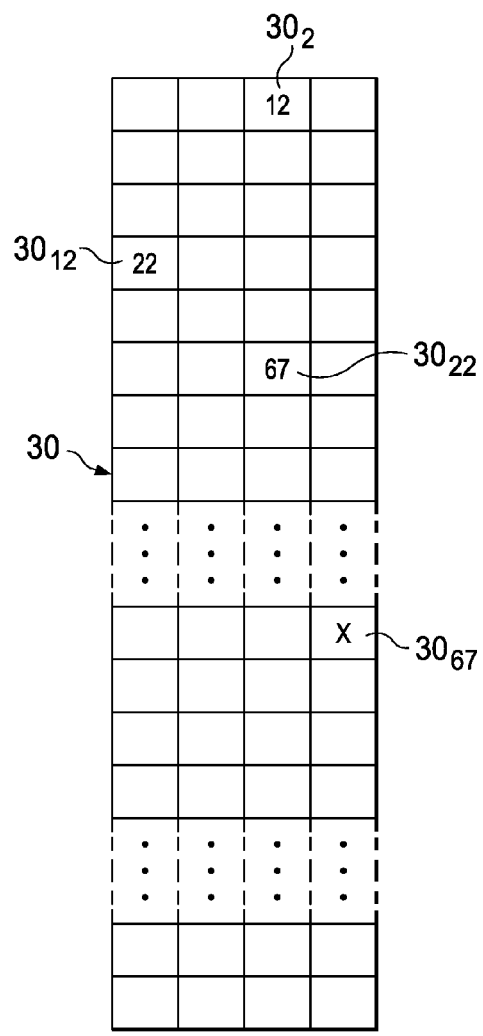

FIG. 7d illustrates the contents of linking RAM 30 in this example, illustrating the "next descriptor index" values stored in the various entries before the appending of the next packet. As described above, each entry $30_i$ in linking RAM 30 implicitly refers to its own descriptor index value by its location within linking RAM 30, and explicitly stores the descriptor index value of the next packet descriptor in the queue. Linking RAM 30 thus provides a map through the packets in the queue, given the descriptor index value of the head packet in that queue. In this example, queue control register $42_0$ indicates that the head descriptor index value is 2 (FIG. 7b). Referring to the map of linking RAM 30 in FIG. 7d, linking RAM entry $30_2$ stores the value 12 as its next descriptor index. Linking RAM entry $30_{12}$ for that next packet descriptor stores the value 22 as its next descriptor index, and linking RAM entry $30_{22}$ for that next packet descriptor stores the value 67 as its next descriptor index. Linking RAM entry $30_{67}$, associated with the packet descriptor at the memory location corresponding to descriptor index value 67, is the tail entry in the queue; as such, it stores a null value for its next descriptor index value. The order of the entire queue of four packets is thus specified by linking RAM 30.

As mentioned above, multiple queues may be managed simultaneously by queue manager 25. As such, other entries $30_i$ in linking RAM 30 may have their own next descriptor index values referring to the sequence of packets in other queues, without contention among the queues and descriptor index values within linking RAM 30.

Figure 7E:
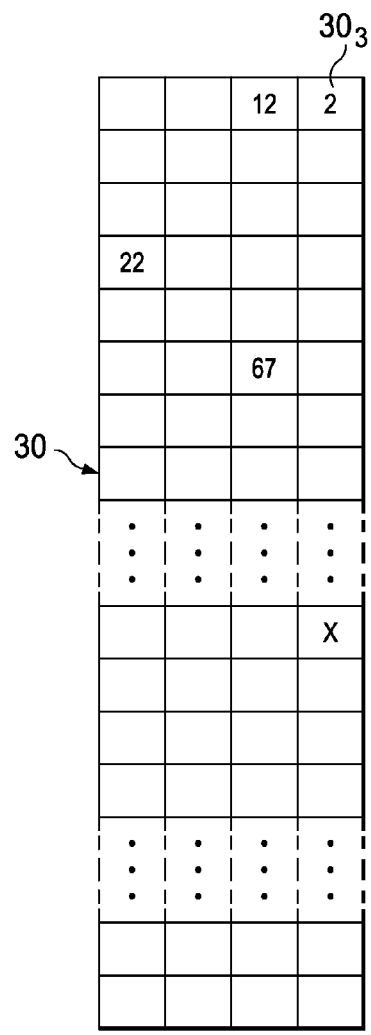

In the example of FIGS. 7a through 7e, a packet with a descriptor at a memory address corresponding to a descriptor index value of 3 is to be added to the head of the queue (see FIG. 7a). FIG. 7c illustrates the contents of queue control register $42_0$, and FIG. 7e illustrates the contents of linking RAM 30, both following the appending of that new packet to the queue. As shown in FIG. 7e, linking RAM entry $30_3$ corresponding to the new packet is written to contain the value 2 as its next descriptor index value, which points to linking RAM entry $30_2$ that was previously at the head of the queue. Because the new packet corresponding to descriptor index value 3 is now at the head of the queue, queue control register $42_0$ stores the value 3 as the head descriptor index (FIG. 7c). The tail descriptor index value is unchanged, but the number of entries in the queue is updated to reflect that five packets are now in the queue. The total number of data packet bytes in the queue (i.e., the previous number of bytes in the queue plus the number of data packet bytes added by the new packet) and the head data packet size are updated as appropriate and if desired.

Figure 6B:
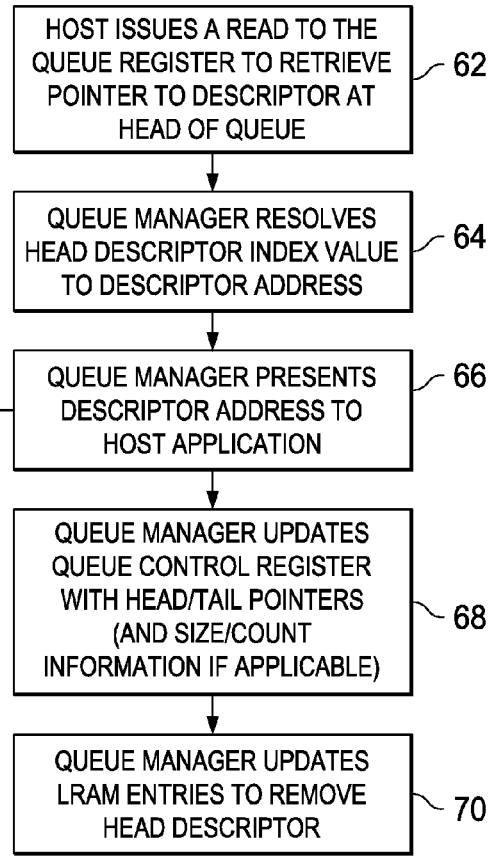

Referring now to FIG. 6b, a process of dequeuing a packet from a packet queue according to this embodiment of the invention will now be described. The process of FIG. 6b is effectively the reverse of the queuing process of FIG. 6a, as will be evident from the following description. According to this embodiment of the invention, each pop of a packet is taken from the head of the queue. As such, the packet queue can operate as a stack if packets are added to the head of the queue, and operate as a FIFO if packets are added to the tail of the queue, and can operate as a dynamic mix of a stack and FIFO if packets are selectively added to the head and tail of the queue during operation.

In process 62, one of the host applications initiates a pop of the head packet from a queue by issuing a read command to the queue register $45_k$ corresponding to the queue from which the packet is to be retrieved. According to this embodiment of the invention, queue registers 45 are contained within RAM internal to queue manager 25, such that read access of queue register $45_k$ is effected by queue manager logic 40 forwarding the desired contents to a "mailbox" input/output register along with a "ready" signal, in this example. In process 64, queue manager logic 40 begins responding to this queue register read command by resolving the head descriptor index value (stored in queue control register $42_k$ for that queue) into a descriptor pointer (i.e., memory address), using the contents of base address register $44_j$ associated with the region in memory at which the corresponding descriptor resides, as indicated by the descriptor index. Upon resolving this descriptor pointer address, queue manager 25 presents that value to the host application via the "mailbox" register in combination with a "ready" signal, in this architecture, in process 66. The host application is then able to use that pointer or address to retrieve the packet descriptor itself from its location in memory space 50, and to then retrieve the data packet indicated by that descriptor, in process 67.

In process 68, queue manager 25 updates queue control register $42_k$ for the queue from which the head descriptor was popped by the host application. Referring to FIG. 5a, this updating process 68 will involve at least the updating of the head index field in queue control register $42_k$ with the descriptor index value stored in the linking RAM entry $30_i$ for the descriptor being popped from this queue by the host application. In other words, upon popping a packet descriptor from the head of the queue, the next packet descriptor in the queue becomes the new head descriptor in that queue. Other fields in queue control register $42_k$ that contain previously valid data are also updated in process 68, including the number of entries in the queue and the total number of bytes in the queue; the packet descriptor size of the new head descriptor, and the data packet size of that packet, are also updated if appropriate.

Also in response to the pop of a packet from the queue, queue manager 25 updates the appropriate entry or entries in linking RAM 30 to effectively clear the entry corresponding to the retrieved head descriptor from the queue, in process 70. This clearing can be carried out by clearing the next descriptor pointer and other information in the corresponding linking RAM entry $30_i$. Alternatively, process 70 may simply involve doing nothing to the contents of that entry $30_i$ at this time, as that entry will not be considered to be in any queue unless another linking RAM entry points to it as a next descriptor index, or unless a queue control register 42 indicates that entry as its head descriptor index; absent those events, the linking RAM entry $30_i$ corresponding to the previous head descriptor will not be interrogated, and its contents can remain until being overwritten upon its associated descriptor later becoming added to a queue.

The popping of a packet descriptor from a queue by a host application is thus completed, and the queue is ready for the next push or pop operation, as the case may be.

Queue manager 25 can also carry out additional functions in response to commands and requests from one or more host applications, or from processor 20 itself. For example, queue manager 25 can readily divert the contents of one queue to another queue, through the use of linking RAM 30 and the corresponding entries in the appropriate queue control registers 42. To do so, for example, queue manager 25 would update the head or tail descriptor index value (depending on whether the diverted queue is being added to the head or tail of the destination queue), and other fields as appropriate, in the queue control register 42 to include the newly added queue. In addition, for the case in which the diverted queue is appended to the tail of the destination queue, the next descriptor index value of the linking RAM entry $30_i$ corresponding to the tail of the destination queue would also be updated to point to the head descriptor index of the diverted queue that is being appended; conversely, if the diverted queue is being placed at the head of the destination queue, the next descriptor index value of the linking RAM entry $30_i$ at the tail of the diverted queue will be updated to point to the head descriptor index of the destination queue. Indeed, those skilled in the art can also readily comprehend that a diverted queue may be inserted within a destination queue by the modification of the next descriptor index values in the linking RAM entries $30_i$ for the appropriate descriptors (i.e., to point to the head of the inserted queue and to the head of the terminal portion of the destination queue from the tail of the inserted queue).

Other optional functions that can readily be implemented into queue manager 25 according to this embodiment of the invention include the ability to provide a host application or processor 20 itself with the ability to identify pending queues, and to evaluate the status of a pending queue without popping a descriptor from the queue.

In this regard, FIG. 8a illustrates queue pending register 73 according to this embodiment of the invention, by way of which a host application or processor 20 can quickly determine which queues are currently active. In this example, sixty-four queues are managed by queue manager 25 (or multiple queue managers 25, if implemented). In this case, queue pending register 73 is implemented as two sub-registers 73a, 73b, each of which includes a single bit associated with each of thirty-two queues. Queue pending sub-register 73a is a thirty-two bit register indicating the status of queues #0 through #31, and queue pending sub-register 73b is a thirty-two bit register indicating the status of queues 32 through 63. In this example, each bit in queue pending register 73 indicates whether its associated queue contains one or more packets available to be popped. According to this embodiment of the invention, queue pending sub-registers 73a, 73b are read-addressable (either separately or concurrently) or otherwise exported to host applications and processor 20. Upon reading the contents of one or both of queue sub-registers 73a, 73b, a host application or processor 20 can easily determine, effectively in "bit-map" form, which queues contain pending packets. It is contemplated that the host applications can comprehend which of the available queues serve as one of its "ingress" queues (i.e., a queue from which the host application receives data for processing); accordingly, the information presented by queue pending register 73 efficiently indicates the availability of ingress data to these host applications.

Another one of these optional control functions mentioned above, as provided by this embodiment of the invention, is the communication of active queue contents to host applications and to processor 20 without requiring those entities to pop a packet from the queue. FIG. 8b illustrates queue status register $75_k$, which is associated with one of the queues (queue k). Queue status register $75_k$ is a read-addressable register (relative to host applications and to processor 20) that stores various information regarding its associated queue; queue manager 25 maintains the contents of queue status register $75_k$, based on the information stored in queue control register $42_k$ for that queue. Alternatively, queue status register $75_k$ may simply correspond to an addressable portion of queue control register $42_k$ (which is otherwise internal to queue manager 25, in this embodiment of the invention). In this example, queue status register $75_k$ includes fields indicating the number of entries in its queue, the total number of data packet bytes currently in the queue, and also the packet descriptor size and data packet size of the packet currently at the head of this queue.

In operation, a host application (or, as mentioned above, processor 20) can access either or both of queue pending register 73 and queue status registers 75 to easily identify and determine the status of a pending queue, without popping a packet from that queue. In one example, the host application can request a read of queue pending register 73 to identify the queues with one or more pending packets; if the host application is interested in one of the active queues identified in queue pending register 73, it can then request a read of queue status register $75_k$ for that active queue to readily determine how many packets, how many data bytes, and the particulars of the head packet, in that queue. As mentioned above, a read to queue register $45_k$ is interpreted by queue manager 25 as a request to pop the head packet from the corresponding queue, but a read to queue status register $75_k$ is not a request to pop any packet from the queue. As such, queue status registers 75 enable the host applications to "peek" into the status of a queue without necessarily dequeuing a packet from that queue.

As is evident from the preceding description, management of packet queues can be easily and efficiently carried out by reading and updating local memory locations, including a linking RAM and various registers that are local to the queue manager logic. Because these queue management resources can be implemented locally to the processor, rather than in external memory, the rate at which packets can be enqueued and dequeued is substantially faster according to this embodiment of the invention than in conventional packet-queuing architectures. The speed of these operations is also facilitated in this embodiment of the invention because only the descriptor index values are written and read in the queue management operations, rather than writing and reading packet descriptor memory addresses. The use of descriptor index values, and the reduced memory requirements for storing these descriptor index values, also keeps the memory requirements for the linking RAM and various registers modest, further facilitating the implementation of these functions within the same integrated circuit as the processing logic.

This invention also enables flexibility in the arrangement of packet queues. New packets can readily be added either to the head or to the tail of an existing queue; indeed, as mentioned above, queues can be merged with one another by carrying out relatively few simple memory accesses. The length of a given queue is effectively unlimited (i.e., limited only by the number of data elements serving as potential descriptors), because of the implementation of these queues as a linked list. This flexibility provides not only improved performance, but also a wider flexibility in the packet-based communications managed by this system.

As mentioned above, these embodiments of the invention have been described in connection with the example of a cable modem gateway system. Those skilled in the art having reference to this specification will readily recognize that this invention is similarly beneficial when applied to other system and communications applications, such as base stations for wireless telephony, set-top boxes in a cable or satellite entertainment system, and network adapters according to other communications technologies. For another example, it is contemplated that this invention will be useful when implemented for interprocess communications within a computer system. As known in the art, the term "interprocess communications" (IPC) refers to communications among two or more threads in one or more computing processes; these multiple processes can be executing within a single computer, or in a multiprocessor environment. An example of an approach to interprocess communications is described in Ramachandran et al., "Hardware Support for Interprocess Communications", *Trans. on Parallel and Distributed Systems*, Vol. 1, No. 3 (IEEE, 1990), pp. 318-29. It is contemplated that this invention will be beneficial in these and even other communications technologies.

Referring now to the state diagram of FIG. 9, the "life" of a packet being managed and communicated by cable modem processor 15 will now be described, for purposes of understanding another embodiment of this invention. As discussed above relative to FIG. 5c, certain addressable locations in memory space 50 are available for, if not dedicated to, the storing of packet descriptors. As described above, each packet descriptor includes a pointer to another location in memory at which its corresponding data packet resides; this pointer to the data packet can change over time, depending on memory usage. If a particular memory location reserved for a descriptor is not associated with a valid data packet (e.g., its data packet pointer is either empty or not valid), that packet descriptor is considered "free", and is available to be assigned to a valid data packet. This state is illustrated in FIG. 9 by free state 72.

In order for a packet to be processed by cable modem processor 15, as discussed above, one of the available resources such as a host application must associate valid data with a packet. This association corresponds to process 52 in FIG. 6a. As described above, the tasks involved in this process 52 includes the defining and storing of a data packet in memory, either in on-chip RAM 22 or external RAM 16, and also includes the defining of a packet descriptor 46 for that data packet. The valid data may already reside at a location in memory space 50, in which case the corresponding packet descriptor 46 is merely written with a pointer to the memory location of the valid data; conversely, the valid data for the packet may be written into a memory location that is or will be specified by the associated packet descriptor. As described above, the host application (including a network adapter or interface that receives and transmits packets) writes data corresponding to packet descriptor 46 in a location of memory space 50 that is allocated for packet descriptors, for example one of regions 0 and 1 in the example of FIG. 5c. Of course, the particular region in which the packet descriptor 46 is stored depends on the necessary size for that descriptor. According to this embodiment of the invention, this packet descriptor is also added to an active queue, for example by way of processes 54 through 60 described above relative to FIG. 6a.

During the defining and receiving of data, and the pushing of the corresponding packet descriptor 46 onto a queue, the packet can be considered as in "receiving" state 74 of FIG. 9. The term "receiving" in this context means that the data in the data packet portion of the packet is being received from a source host application. The data in this packet may have been received over the network, or may instead be data that are to be transmitted over the network—the "receiving" in this instance refers to the receipt of the data from a source host application (even if that host application is itself in the process of "transmitting" these data over the network).

Once the new packet is defined and enqueued in this manner, that packet can be considered to be in "processing" state 76. Processing state 76 corresponds to a packet that is in an active queue, and awaiting its transmission to its eventual destination. Typically, according to the description above, processing state 76 refers to those packets that are in an active queue but not at the head of the queue—in other words, those packets that are ready for and awaiting transmission.

Upon a packet reaching the head of an active queue that is the subject of a "pop" or dequeue request by a host application, the packet makes a transition to "transmitting" state 78. The term "transmitting" in this event refers to the transmission of the data packet to its destination host application; these data may be data that have been received over the network and demodulated, or may be data that are to be transmitted over the network—the "transmitting" in this instance refers to transmission of the data to a destination host application (even if that host application is "receiving" this data from the network). An example of the actions performed while a packet is in "transmitting" state 78 is described above in this specification, with reference to processes 62 through 67 of FIG. 6b.

Once the packet is "transmitted" to its destination host application, and its packet descriptor 46 popped from head of the current active queue, that packet no longer contains valid data that are associated with an active queue. This packet is thus "free" to be used again in connection with another packet. As such, this packet has returned to its "free" state 72. The processing of FIG. 9 can then be repeated for this packet, for example in the manner described above.

As mentioned above, queue manager 25 is capable of managing multiple queues of packet descriptors, such queues numbering as many as hundreds or thousands. Indeed, multiple queue managers 25 may be implemented to facilitate the management of these multiple queues. According to another embodiment of the invention, one of these multiple queues is designated as a queue of packet descriptors that are each in their "free" state 72. The packet descriptors in this free packet descriptor queue are those packet descriptors that are not associated with an active queue or with a data packet having valid data. The free packet descriptors in this free packet descriptor queue are thus available for use in connection with a new data packet either being prepared for transmission or received from the network. And according to this embodiment of the invention, the free packet descriptor queue is itself a "linked list", in that the free packet descriptors are arranged in a sequence from a head packet descriptor to a tail packet descriptor, with each packet descriptor beginning from the head packet descriptor pointing to the next packet descriptor in the free packet descriptor queue.

Figure 10:
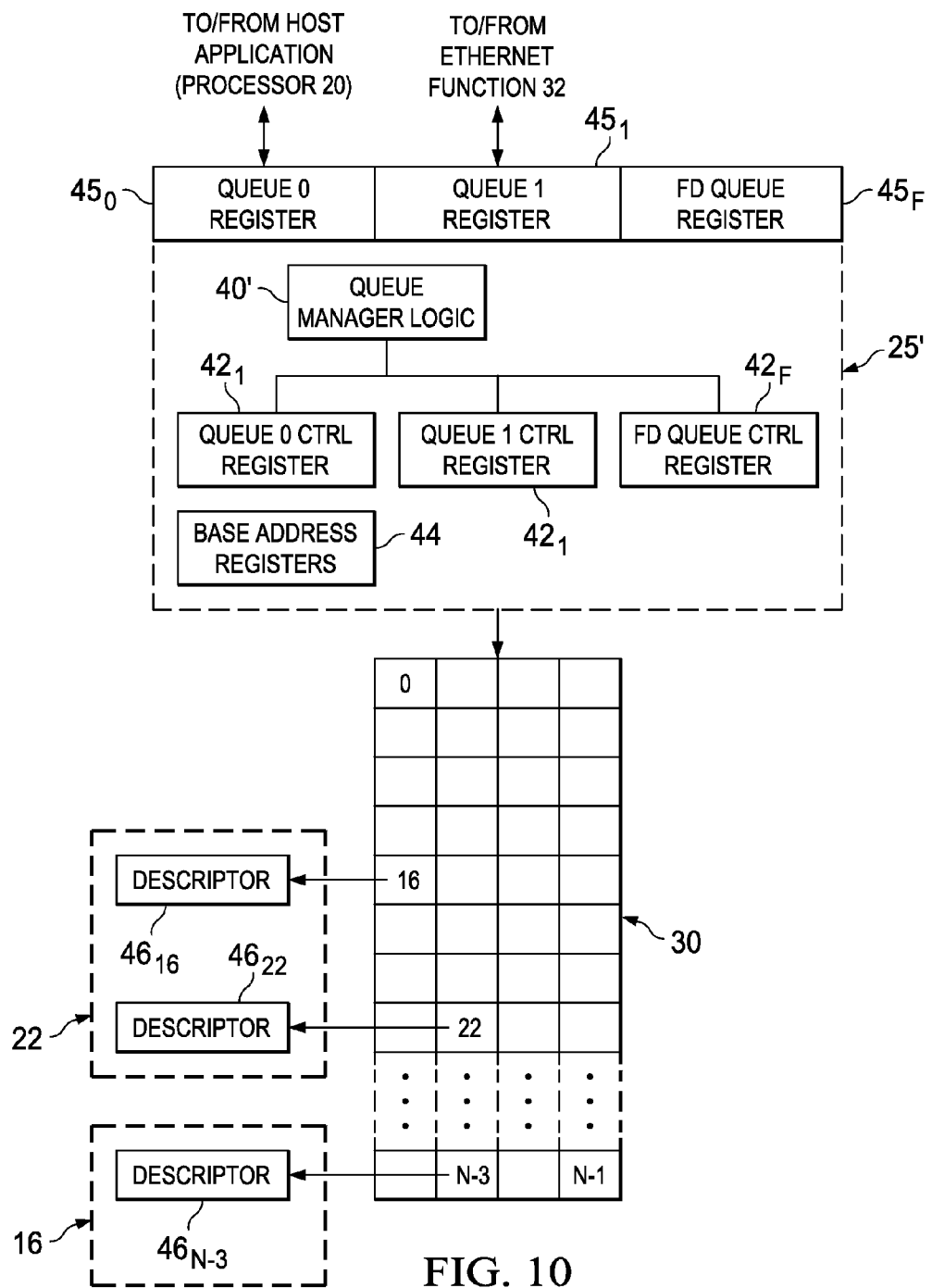
FIG. 10 illustrates the arrangement of the contents of a queue register, a linking memory entry, and base address registers, as managed by the architecture of FIG. 4 according to an embodiment of the invention.

FIG. 10 illustrates the functional architecture of the packet queue management by cable modem processor 15 according to this embodiment of the invention, in which packet descriptors in their "free" state are maintained in a queue. The components and elements common between the architecture shown in FIG. 4 and that shown in FIG. 10, and that are of similar construction and operation in those two architectures, are referred to by the same reference numerals and will not be described in further detail relative to FIG. 10.

As shown in FIG. 10, queue manager 25' includes queue manager logic 40' in combination with various registers 42, 44, 45. Queue manager logic 40' of FIG. 10 is constructed of combinational, sequential, or programmable logic that processes push (enqueue) or pop (dequeue) requests received from the various host applications in cable modem gateway 12. As before, in response to requests from the host applications made to a corresponding one of queue registers 45 for a queue, queue manager 25' manages the corresponding queue to make the requested addition or deletion to that queue. As evident from FIG. 10 and as discussed above, multiple packet queues are maintained by queue manager 25. Each queue is managed by a corresponding queue control register 42 that are managed by queue manager 25'. In the example shown in FIG. 4, two active queues (queue #0 and queue #1) are managed by queue manager 25' by way of corresponding queue control registers $42_0$, $42_1$. The host applications make requests by way of writes or reads to two queue registers $45_0$, $45_1$ (either within queue manager 25 or, alternatively, in a register file of processor 20), one for each of the two active queues #0 and #1. The number of queue control registers 42 and corresponding queue registers 45 for active queues may number as many as 512 or so, as mentioned above. Queue manager 25' also includes base address registers 44, one for each queue, for resolving the memory address of a packet descriptor into a descriptor index, as will be described in further detail below.

In this embodiment of the invention as shown in FIG. 10, queue manager 25' and its queue manager logic 40' manage a free descriptor queue in which packet descriptors that are not associated with an active queue are maintained in a linked list fashion. Queue control register $42_F$ is arranged similarly as queue control registers $42_0$, $42_1$, for example as described above relative to FIG. 5a. As such, queue control register $42_F$ includes indicators of the descriptor index values for the free packet descriptors at the head and tail of the free packet descriptor queue, as well as other information such as the number of free descriptors in the queue, and perhaps the size of the packet descriptor at the head of the free descriptor queue. As valid data is not associated with the packet descriptors in the free descriptor queue, the optional field indicating the size of the data packet for the free descriptor queue is not useful in free descriptor queue register $45_F$.

In addition, free descriptor queue register $45_F$ is provided to allow host applications access to the free descriptor queue. More specifically, a host application can obtain a packet descriptor from the free descriptor queue by way of a read to free descriptor queue register $45_F$, responsive to which queue manager logic 40' will return identification of the packet descriptor currently at the head of the free descriptor queue. The host application can then arrange the data packet to be associated with that packet descriptor, and enqueue that packet for processing and transmission in the usual manner, for example as described above relative to FIG. 6a.

FIG. 10 illustrates linking RAM 30, by way of which the linked lists of packet descriptors corresponding to the various queues can be readily maintained by way of descriptor index values, as described above. According to this embodiment of the invention, the free descriptor queue is also maintained by linked descriptor index values stored in on-chip linking RAM 30, in similar manner as described above for the active queues. However, it is contemplated that the maintaining of a free descriptor queue according to this invention need not necessarily use linking RAM 30 to link the free descriptors in the queue with one another. Indeed, it is contemplated that this aspect of the invention relating to the maintaining of the free descriptor queue can be alternatively be implemented using conventional packet descriptors that each explicitly include a next descriptor pointer address. But it is also contemplated that the performance of queue manager 25' will be optimized through the use of linking RAM 30 to maintain the linked list of free packet descriptors, as described above.

As evident from the foregoing description, and as illustrated in FIG. 10, some packet descriptors 46 are mapped to memory addresses within on-chip RAM 22, while other packet descriptors are mapped to memory addresses in external RAM 16. The latency of accesses to external RAM 16 is, of course, substantially longer than that of accesses to on-chip RAM 22. It has been discovered, in connection with this invention, that the frequency with which packet descriptors mapped to on-chip RAM 22 can be maximized, and thus the overall performance of queue manager 25 and cable modem processor 15 optimized, by way of management of the free descriptor queue according to this embodiment of the invention.

According to this embodiment of the invention, each packet descriptor 46 includes an indication of whether its mapped memory address is within on-chip RAM 22, or is rather within external RAM 16. This indication can, of course, come directly from the memory address of the packet descriptor 46 itself; functionality within queue manager logic 40' can evaluate this packet descriptor address (or, indirectly, its mapped descriptor index value) relative to a table or other map by way of which on-chip memory addresses in memory space 50 can be distinguished from external memory addresses in memory space 50. Alternatively, the packet descriptor itself can include a flag indicating whether its corresponding memory address is in on-chip or external memory, as will now be described relative to FIG. 11.

Figure 11:
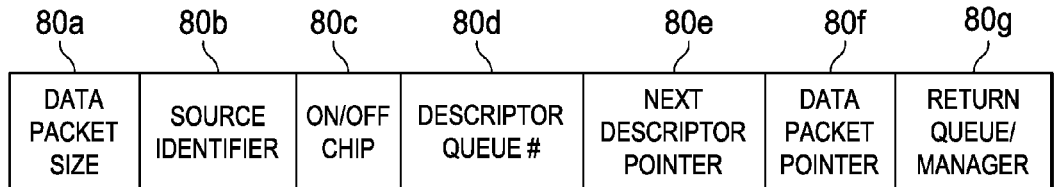
FIG. 11 illustrates the arrangement of the contents of a packet descriptor according to an embodiment of the invention.

FIG. 11 illustrates the contents of an example of packet descriptor $46_x$ according to this embodiment of the invention. Packet descriptor $46_x$ typically includes several fields that relate to the attributes of its associated packet; as known in the art, the use of a packet descriptor in this manner eliminates the need to store identification, control, and other overhead information with the payload data packet. Indeed, the data packet is often stored in a different memory location, as discussed above. Packet descriptor $46_x$ as shown in FIG. 11 is presented by way of example only, with reference to certain of its fields and content; in practice, packet descriptors can omit some of the fields shown in FIG. 11, and may likely include other fields useful in the management of the communications packets.

In the example of FIG. 11, packet descriptor $46_x$ includes data packet size field 80*a*, which is indicative of the size of the data payload of this packet. Source identifier field 80*b* identifies the one of the host applications or other functionality in the system that is the source of the data in this packet. Descriptor queue field 80*d* stores an indicator of the queue in which this packet descriptor $46_x$ resides (if any); if this packet descriptor $46_x$ is a "free" descriptor, this field 80*d* will of course contain a number associated with the free descriptor queue. Next descriptor pointer 80*c* stores a memory address of the next packet descriptor 46 in the queue in which packet descriptor $46_x$ resides, whether an active queue or the free descriptor queue according to this invention; as discussed above, the use of linking RAM 30 to link packet descriptors can eliminate the need to explicitly store a pointer to the next packet descriptor in the queue. However, even if linking RAM 30 is used, it may be useful to also maintain that next descriptor pointer within field 80*c* of packet descriptor $46_x$ as shown. Of course, if linking RAM 30 is not used, then field 80*e* is used to link to the next packet descriptor. Data packet pointer 80*f* stores an address pointer, or more directly the memory address itself, of the payload data packet associated with packet descriptor $46_x$.

According to this embodiment of the invention, field 80*c* in packet descriptor $46_x$ is a flag that indicates whether this packet descriptor $46_x$ resides in on-chip or external memory, relative to processor 15. Field 80*c* may simply be a one-bit flag, or alternatively may be a multiple-bit field if there are more than two types of memory that are to be considered in arranging the free descriptor queue (e.g., slowest, slow, fast, and fastest can be represented by a two-bit field 80*c*). This field 80*c* facilitates the management of the free descriptor queue, as will be now be described in detail relative to FIGS. 12*a* and 11*b*.

In addition, it is contemplated that field 80*c* may not necessarily be used to distinguish between on-chip and off-chip memory locations at which packet descriptor $46_x$ is located, but rather can distinguish between memory resources that have different access times or access latency. For example, packet descriptors may be stored entirely in memory external to processor 15, but in two or more memory resources having different access performance (e.g., high-speed static RAM, on one hand, and slower dynamic RAM, on the other hand). Field 80*c* may therefore indicate which of these two external memory resources stores the particular packet descriptor $46_x$.

Also as shown in FIG. 11, packet descriptor $46_x$ includes return queue field 80*g*. Return queue field 80*g* stores an indicator of the queue into which packet descriptor $46_x$ is to be placed upon completion of its transmitting state 78. According to this embodiment of the invention, and following the state diagram of FIG. 9, this return queue field 80*g* preferably points to the free descriptor queue. As mentioned above, multiple queue managers 25, 25' may be implemented within processor 25; as such, return queue field 80*g* can also indicate which of the multiple queue managers 25, 25' is to process this packet descriptor $46_x$ upon its return. Preferably, the contents of this return queue field 80*g* are set by the host application for each packet descriptor 46 upon initialization, and is then not subsequently alterable. It is also contemplated that the functionality of return queue field 80*g*, and of the returning of packet descriptor $46_x$ to a return queue, can be enabled or disabled by the setting or clearing of a return policy bit or flag in a control register of processor 15.

Figure 12A:
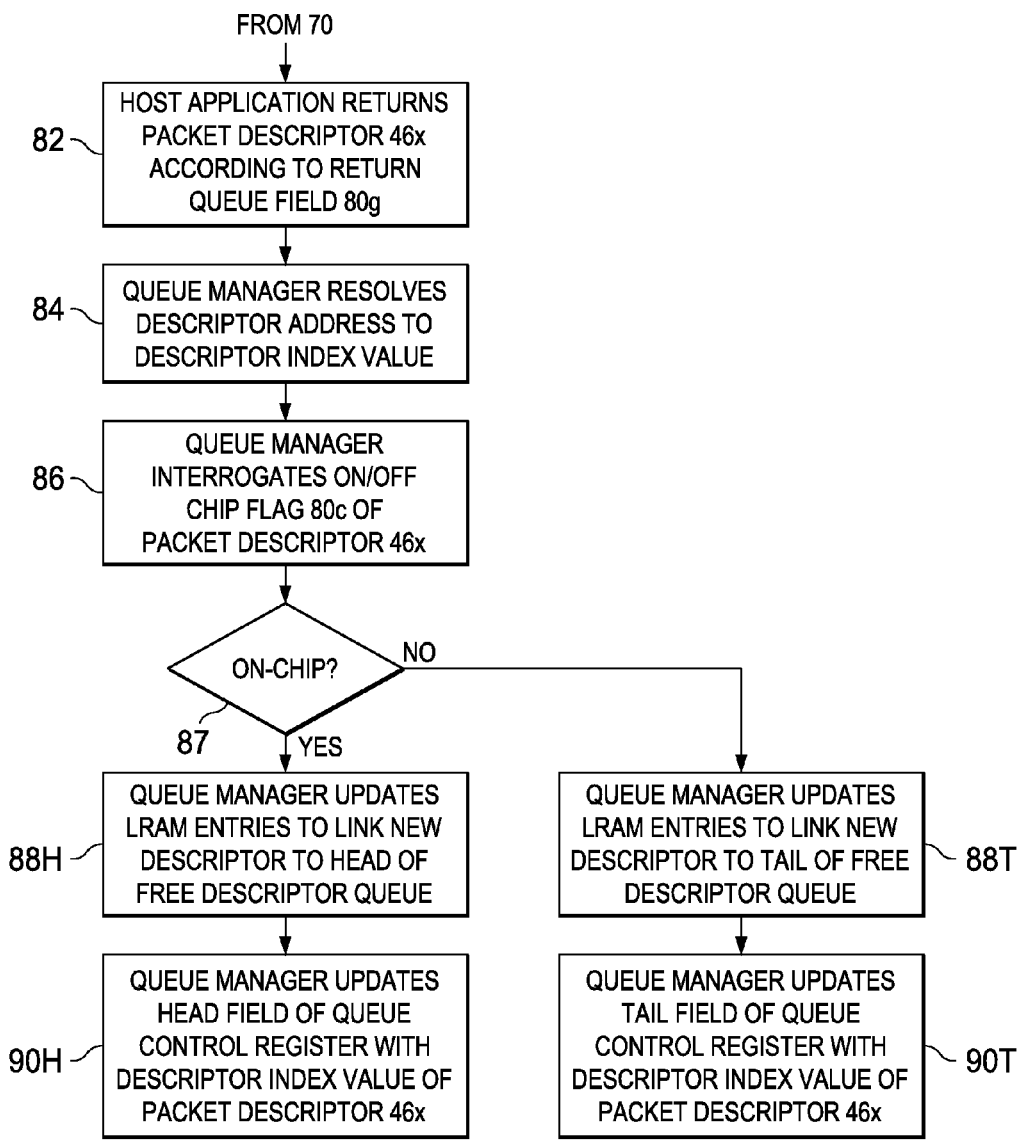
FIGS. 12a and 12b are flow diagrams illustrating the operation of a queue manager in managing a free descriptor queue by the queue management architecture of FIG. 10, according to that embodiment of the invention.

FIG. 12*a* illustrates the operations carried out by queue manager 25' in placing a packet descriptor into the free descriptor queue, according to this embodiment of the invention. As shown in FIG. 12*a*, the placing of packet descriptor $46_x$ into this free descriptor queue begins once a packet has been popped or dequeued from an active packet queue and transmitted by a host application, for example upon completion of process 70 (FIG. 7*b*). To avoid conflicts and coherency issues, as discussed above, the host application preferably interrogates return queue field 80*g* in packet descriptor $46_x$ to identify its return queue upon transmission of the associated data packet, which in this case is the free descriptor queue; if multiple queue managers 25, 25' are implemented within processor 15, return queue field 80*g* also indicates queue manager 25' to which the return is to be made. Upon identification of the return queue as the free descriptor queue, the host application executes process 82 (FIG. 12*a*) to present a return request to queue manager 25' for packet descriptor $46_x$. This return request in process 82 is preferably carried out by the host application requesting a write to queue register $45_F$, which is the queue register 45 associated with the free descriptor queue, as described above relative to FIG. 10. In process 84, queue manager 25' (via its queue manager logic 40) resolves the memory address of this packet descriptor $46_x$ to its descriptor index value, in similar manner as described above in connection with process 56 (FIG. 6*a*).

According to this embodiment of the invention, the placement of packet descriptors 46 in the free descriptor queue depends on whether the memory location of the returned packet descriptors is on-chip or off-chip, relative to queue manager 25'. As such, in process 86, queue manager logic 40 in queue manager 25' interrogates the on/off chip flag 80*c* of packet descriptor $46_x$, and executes decision 87 to determine whether packet descriptor $46_x$ resides in on-chip RAM 22 or in external RAM 16. Alternatively, as mentioned above, this determination of process 86 and decision 87 can be made by queue manager 25' determining whether packet descriptor 46$_x$ resides in on-chip RAM 22 or external RAM 16 from its memory address, if no on/off chip flag 80$c$ is incorporated into packet descriptor 46$_x$. Further in the alternative, if queue manager 25' or the host application recently handled this packet descriptor 46$_x$, that entity can retain an indication of whether packet descriptor 46$_x$ is on-chip or off-chip; in this event, interrogation of on/off chip flag 80$c$ or decoding of the memory address to determine its location, can be avoided.

If packet descriptor 46$_x$ resides in on-chip RAM 22 (decision 87 is YES), queue manager 25' appends this returned packet descriptor 46$_x$ to the head of the free descriptor queue. If linking RAM 30 is present and used in connection with the free descriptor queue, as described above, queue manager 25' updates the entries in linking RAM 30 to append packet descriptor 46$_x$ to the head of the free descriptor queue, in process 88H. This is accomplished, in this example, by queue manager logic 40 reading the descriptor index of the descriptor currently at the head of the free descriptor queue from the head index field of queue control register 42$_F$. This descriptor index value pointing to the previous head of the queue is then written into this linking RAM entry 30$_x$ associated with packet descriptor 46$_x$ being returned to the free descriptor queue; the size of packet descriptor 46$_x$ can also be written into linking RAM entry 30$_x$, if desired. In process 90H, queue control register 42$_F$ for the free descriptor queue is updated by queue manager logic 40 of queue manager 25', to reflect the new head packet descriptor 46$_x$. In this embodiment of the invention, referring to FIG. 5$a$, the head descriptor index of queue control register 42$_F$ is updated with the descriptor index value for newly returned on-chip packet descriptor 46$_x$. Other information currently valid in queue control register 42$_F$ may also be updated as appropriate to store valid data for the number of entries and total number of packet descriptor bytes in the free descriptor queue, and to also store the new head packet descriptor size.

If, on the other hand, the returned packet descriptor 46$_x$ resides in external RAM 16 (decision 87 is NO), then packet descriptor 46$_x$ is appended to the tail of the free descriptor queue, according to this embodiment of the invention. In this embodiment of the invention in which linking RAM 30 is present and used in connection with the free descriptor queue, this appending is carried out by queue manager logic 40 updating linking RAM 30 in process 88T. Because packet descriptor 46$_x$ is being appended to the tail of the free descriptor queue, queue manager logic 40 reads the descriptor index for the descriptor currently at the tail of the queue from the tail index field of queue control register 42$_F$, and updates the next descriptor index field of the linking RAM entry 30$_i$ descriptor index corresponding to that descriptor currently at the tail of the queue with the descriptor index value for newly returned and appended packet descriptor 46$_x$. This links packet descriptor 46$_x$ to the tail of the free descriptor queue. The size of packet descriptor 46$_x$ can also be written to linking RAM entry 30$_x$, if desired. In process 90T, queue control register 42$_F$ for the free descriptor queue is updated by queue manager logic 40 by writing the descriptor index value for the new free packet descriptor 46$_x$ to as tail descriptor index. Other information in queue control register 42$_F$ (FIG. 5$a$) may also be updated as appropriate.

In either case, upon completion of process 90H, 90T, the returned packet descriptor 46$_x$ is now appended to the free descriptor queue, either at the head or tail depending on whether packet descriptor 46$_x$ resides in on-chip or external memory, relative to processor 15 and queue manager 25'. Eventually, as a number of packet descriptors 46 are placed onto the free descriptor queue, the on-chip packet descriptors 46 will populate the free descriptor queue from its head, while the packet descriptors 46 in off-chip memory will populate the free descriptor queue from its tail. According to the preferred embodiment of this invention, as the host applications request free packet descriptors 46 for the processing and transmission of new data packets, queue manager 25' will provide those packet descriptors 46 from the head end of the free descriptor queue, which as noted above is populated first with free packet descriptors 46 that are in on-chip RAM 22; off-chip packet descriptors 46 are thus provided to the host applications only after all on-chip free packet descriptors 46 have been exhausted. This approach taken by this embodiment of the invention therefore maximizes the use of on-chip packet descriptors 46, and thus optimizes the system performance by minimizing the latency in accessing packet descriptors 46.

Figure 12B:
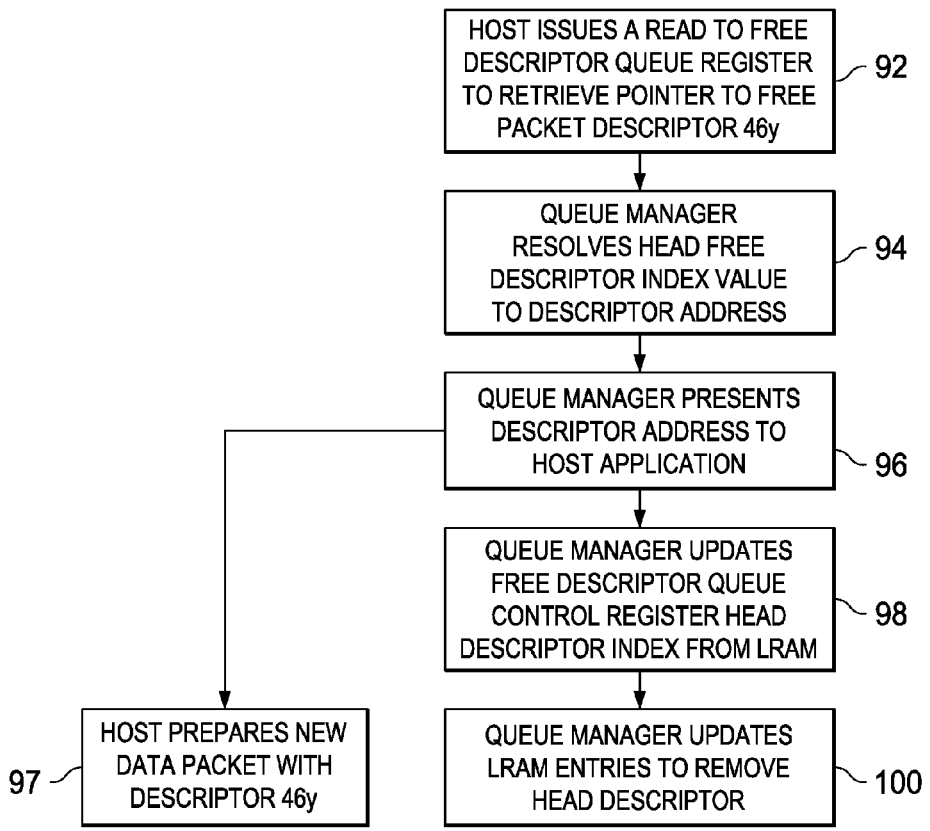

Referring now to FIG. 12$b$, the providing of packet descriptor 46$_y$ from the free descriptor queue according to this embodiment of the invention will now be described. In process 92, a host application requests a free packet descriptor by requesting a read of free descriptor queue register 45$_F$. As described above relative to FIG. 6$b$ for the retrieval of a packet descriptor from an active queue, this read request causes queue manager 25' to execute process 94, in which queue manager logic 40 resolves the head descriptor index value (stored in queue control register 42$_F$ for the free descriptor queue) into a descriptor pointer (i.e., memory address), using the contents of base address register 44$_F$ that is associated with the region in memory at which the corresponding descriptor resides, as indicated by the descriptor index value. Queue manager 25' then presents that descriptor pointer or address to the host application via the "mailbox" register in combination with a "ready" signal, as described above relative to FIG. 6$b$ for this architecture, in process 96. The host application is then able to use that pointer or address to retrieve packet descriptor 46$_y$ from the indicated memory location, and to prepare a new active data packet associated with the newly retrieved free packet descriptor 46$_y$ in process 97.

In process 98, queue manager 25' updates queue control register 42$_F$ for the free descriptor queue by updating the head index field in that queue control register 42$_F$ with the descriptor index value stored in the linking RAM entry 30$_i$ for packet descriptor 46$y$ that was just now popped from the free descriptor queue. As described above relative to FIG. 6$b$ for active queues, the popping of free packet descriptor 46$_y$ from the head of the free descriptor queue moves the next packet descriptor in the free descriptor queue into place as the new free packet descriptor at the head of the free descriptor queue. Other fields in queue control register 42$_F$ can also be updated in process 98 as desired and appropriate.

If linking RAM 30 is implemented and being used in connection with the free descriptor queue, queue manager 25' then also updates the appropriate entry or entries in linking RAM 30 to effectively clear the entry corresponding to packet descriptor 46$_y$ from the free descriptor queue in process 90. As in the case of an active queue, this involves the next descriptor pointer and other information in the linking RAM entry 30$_i$ corresponding to the newly popped packet descriptor 46$_y$. Alternatively, process 90 may simply involve doing nothing to the contents of that entry 30$_i$ at this time; its contents can remain until being overwritten upon that packet descriptor 46$_y$ is later added to a queue.

According to this embodiment of the invention, therefore, the use of packet descriptors resident in on-chip memory can be maximized, by maintaining a free descriptor queue in which on-chip packet descriptors are appended to the head, and off-chip packet descriptors are appended to the tail. By issuing new packet descriptors from the head of the free packet descriptor queue, the likelihood and frequency with which on-chip packet descriptor memory is accessed is maximized relative to the likelihood and frequency of accesses to external packet descriptor memory. The overall performance of the packet-based communications by the system is therefore optimized in this regard.

It has been discovered, according to this invention, that it is useful for host applications to be aware of the number of queued packets in their associated packet queues so that appropriate processing can be performed in a timely manner. Similarly, it is useful for processor 20 or another host application to be aware of the number of free descriptors in the free descriptor queue. According to another embodiment of this invention, therefore, threshold logic associated with the active queues and also with the free descriptor queue provides additional information to the host applications regarding the fullness or emptiness of their associated packet descriptor queues.

Figure 13:
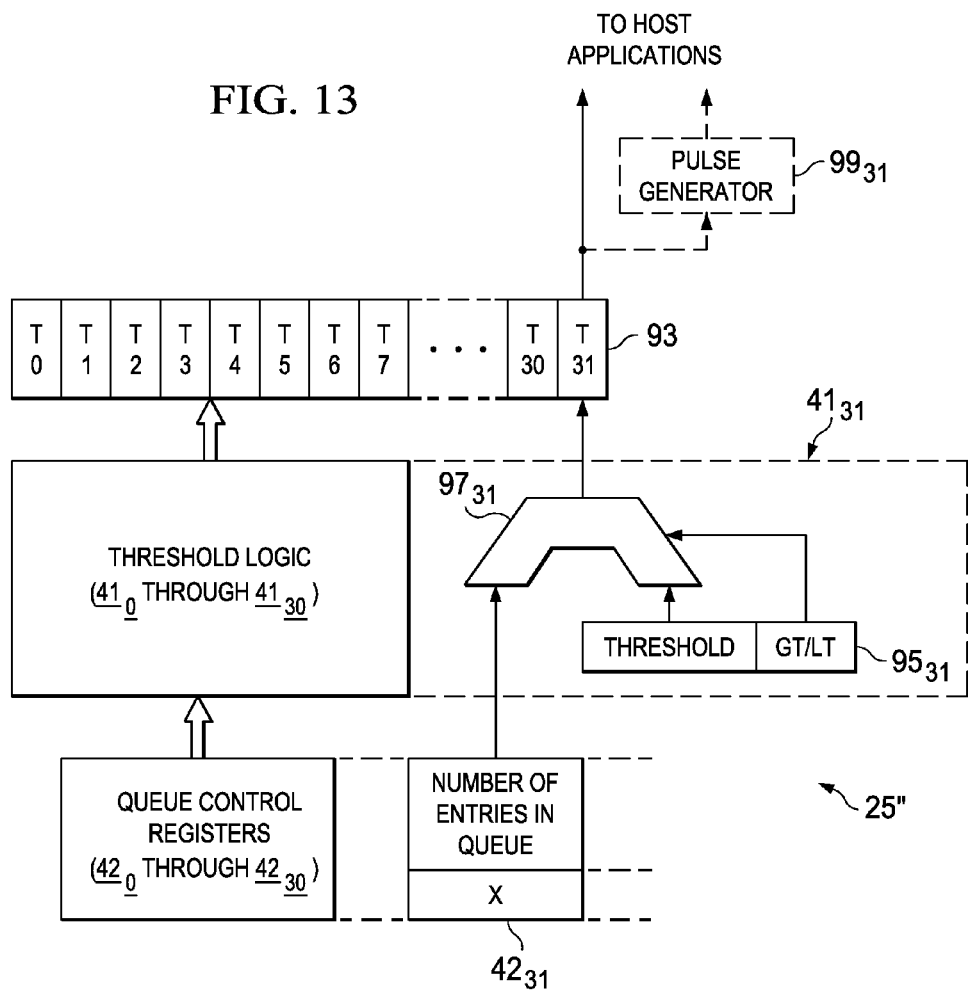
FIG. 13 illustrates a portion of a queue manager including threshold logic, according to an embodiment of the invention.

FIG. 13 illustrates an example of a portion of queue manager 25″ incorporating such threshold logic according to an embodiment of this invention. In this example, thirty-two queues are being managed by this threshold logic; of course, as mentioned above, many more queues may be actually implemented in practice. As shown in FIG. 13, queue manager 25″ includes threshold register 93, which has entries T0 through T31 associated with respective ones of the thirty-two queues (queues #0 through #31) being managed. These queues preferably include the free descriptor queue, for which the threshold logic of this embodiment of the invention is quite useful, as will be discussed below. Each entry in threshold register 93 indicates the result of a comparison of the number of entries in its associated queue with a programmed threshold value. Threshold logic 41 performs this comparison, and sets or clears the associated entry in threshold register 93 for each queue, as will now be described using the example of threshold logic $41_{31}$. It is contemplated that threshold logic 41 associated with each of the other queues may be similarly constructed as threshold logic $41_{31}$ illustrated in FIG. 13. It is of course to be understood that the specific logic illustrated in FIG. 13 and described below is presented by way of example only, and for illustration of the function of the threshold logic function; this function may be constructed according to any one of a number of approaches, or indeed implemented completely in software, as determined for the particular application by the skilled artisan.

As shown in the example illustrated in FIG. 13, threshold logic $41_{31}$ includes comparator $97_{31}$, which sets or clears the state of entry T31 in threshold register 93 associated with queue #31. Comparator $97_{31}$ receives, at one input, the value of the entry in queue control register $42_{31}$ for its associated queue #31. Threshold logic $41_{31}$ also includes register $95_{31}$ which stores the threshold value against which the number of entries indicated by queue control register $42_{31}$ is to be compared by comparator $97_{31}$, as well as flag GT/LT indicating the polarity of the comparison (i.e., whether an active polarity at the output of comparator $97_{31}$ is to be issued by the number of entries being greater than, or less than, the threshold value—of course, these comparisons may be "greater than or equal to", or "less than or equal to", if so desired). The threshold value stored in register $95_{31}$ is applied to a second input of comparator $97_{31}$, while flag GT/LT is applied to a control input of comparator $97_{31}$.

It is contemplated that both the threshold value and the state of flag GT/LT in register $95_{31}$ can be programmed by processor 20, or by external functions including the host applications, to a desired level and polarity. For maximum flexibility and control, this value and state is separately and independently programmed for each of the queues being managed by queue manager 25″. In this manner, each host application can program the threshold level for its associated queues. Alternatively, the contents of register $95_{31}$ may be hard-wired or otherwise fixed in manufacture or otherwise, if desired; further in the alternative, a single threshold value may serve as the threshold value for multiple ones of the queues, thus saving chip area that would be otherwise required for registers 95. Typically, however, it is believed that the optimal decision-making applied by threshold logic 41 for the free descriptor queue will be different from that applied to active queues, and as such it is most useful to utilize a different threshold value (and perhaps a different decision polarity) for the free descriptor queue from the other normal active queues.

In operation, comparator $97_{31}$ compares the current value of the number of queues in its associated queue #31 with the threshold value stored in its associated register $95_{31}$. If flag GT/LT indicates that the desired comparison is whether the number of entries in the queue is greater than the threshold value, comparator $97_{31}$ will issue an active signal at its output if that is the case; conversely, if flag GT/LT indicates that the comparison is a "less than" comparison, comparator $97_{31}$ will issue an active signal if the number of entries is less than the threshold value. The output of comparator $97_{31}$ thus sets or clears the state of entry T31 according to the result of that comparison.

The output of threshold register 93 is then presented or made available to the host applications and to processor 20. For example, the host applications may periodically poll or otherwise interrogate the state of threshold register 93 to determine whether any of its associated queues require action on the part of host application itself. Alternatively, as indicated in FIG. 13, pulse generator $99_{31}$ may be included within queue manager 25″ to issue a pulse or other control signal to the host application hardware upon the threshold condition being met, without threshold register 93 being polled; the host application would then respond to that pulse or other control signal.

Threshold logic 41 and threshold register 93, according to this embodiment of the invention, provides a useful tool in the management of the packet queue communications. For example, a host application may wish to perform a sequence of pops from an active "ingress" queue once a certain number of packets are enqueued. In this case, that certain number of packets can be programmed into the associated threshold register $95_{31}$, along with appropriately setting flag GT/LT, so that the host application will be notified upon the threshold being crossed. Conversely, a host application may wish to transmit (enqueue, or push) packets into a queue upon that queue becoming relatively empty—in this case, of course, the threshold level and flag GT/LT in threshold register 95 for that queue would be appropriately set to notify the host application upon the number of packets in that queue falling below the threshold level. Efficiency in the management of the packet queues can then readily be obtained, without the necessity of the host applications to pop a packet from the queue.

As mentioned above, threshold logic 41 is particularly useful in connection with the free descriptor queue. Processor 20 or the host applications can readily adjust their packet processing in response to the number of packets in the free descriptor queue. For example, if the number of free descriptors falls below a certain threshold level, the priority with which the host applications transmit enqueued packets (and thus produce additional free packet descriptors) can be increased to avoid stalls in the process due to a lack of free descriptors. In addition, the free descriptor queue threshold value can be set to a level corresponding to an expected number of packet descriptors in on-chip memory, so that the host applications can adjust their operation to minimize the use of off-chip packet descriptors. These and other alternative uses of the threshold logic according to this embodiment of the invention will be apparent to those skilled in the art having reference to this specification.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A processor for managing packet-based communications, comprising:
an addressable memory for storing packet descriptors and data packets, each data packet associated with one of the packet descriptors, the addressable memory comprising:
a first memory resource; and
a second memory resource, the second memory resource having slower access performance relative to the processor than the first memory resource; and
a queue manager coupled to the first memory resource and second memory resource for localizing linking, comprising:
queue manager logic circuitry;
linking memory, coupled to the queue manager and having a plurality of entries, each entry mapped to one of a plurality of packet descriptor index values, each packet descriptor index value mapped to a memory address in the addressable memory, and each entry of the linking memory having a field for storing a next packet descriptor index value; and
a free packet descriptor queue control register;
wherein the queue manager keeps base queue information in the first memory resource and adds a packet descriptor to a free packet descriptor queue associated with a free packet descriptor queue control register by performing a sequence of operations comprising:
receiving a return request including a pointer to the location in memory of the packet descriptor to be added;
determining whether the packet descriptor is located in the first memory resource or the second memory resource;
responsive to the packet descriptor being located in the first memory resource, updating a head packet descriptor index field in the free packet descriptor queue control register to refer to the packet descriptor to be added; and
responsive to the packet descriptor being located in the second memory resource, updating a tail packet descriptor index field in the free packet descriptor queue control register to refer to the packet descriptor to be added.

2. The processor of claim 1, wherein the queue manager removes a packet descriptor from the free packet descriptor queue by performing a sequence of operations comprising:
receiving a pop request;
outputting a pointer to the location in memory of the packet descriptor to which the head packet descriptor index field of the free packet descriptor refers;
updating the head packet descriptor index field of the free packet descriptor queue control register to refer to a next packet descriptor in the free packet descriptor queue.

3. The processor of claim 1, wherein the sequence of operations further comprises:
mapping the pointer to a packet descriptor index value;
responsive to the packet descriptor being located in the first memory resource:
reading the head packet descriptor field in the free packet descriptor queue control register to identify the packet descriptor currently at the head of the free packet descriptor queue; and
updating an entry in the linking memory, corresponding to the mapped packet descriptor index value of the packet descriptor to be added, to point to the identified current head packet descriptor; and
responsive to the packet descriptor being located in the second memory resource:
reading the tail packet descriptor field in the free packet descriptor queue control register to identify the packet descriptor currently at the tail of the free packet descriptor queue; and
updating an entry in the linking memory, corresponding to the mapped packet descriptor index value of the identified current tail packet descriptor, to point to the mapped packet descriptor index value of the packet descriptor to be added.

4. The processor of claim 3, wherein the operation of updating the head packet descriptor index field comprises writing the mapped packet descriptor index value to the head packet descriptor index field in the free packet descriptor queue control register;
and wherein the operation of updating the tail descriptor index field comprises writing the mapped packet descriptor index value to the tail packet descriptor field in the free packet descriptor queue control register.

5. The processor of claim 4, wherein the queue manager removes a packet descriptor from the free packet descriptor queue by performing a sequence of operations comprising:
receiving a pop request;
unmapping the mapped packet descriptor index value stored in the head packet descriptor index field of the free packet descriptor queue control register to a pointer to the location in memory of the packet descriptor to be removed;
outputting the pointer to the location in memory of the packet descriptor to which the head packet descriptor field of the free packet descriptor queue control register refers; and
updating the head packet descriptor index field of the free packet descriptor queue control register to store a packet descriptor index value corresponding to a next descriptor in the free descriptor queue.

6. The processor of claim 1, wherein the queue manager is realized in an integrated circuit;
wherein the first memory resource is realized in the same integrated circuit as the queue manager.

7. The processor of claim 6, wherein the second memory resource is realized in a different integrated circuit from that of the queue manager and the first memory resource, wherein packet descriptors are on-chip packet descriptors if they reside in the first memory resource and packet descriptors are off-chip packet descriptors if they reside in the second memory resource.

8. The processor of claim 1, wherein the free packet descriptor queue control register comprises a field indicating the number of packet descriptors in the free descriptor queue;

and wherein the queue manager further comprises:
threshold logic for providing a programmable dynamic threshold on all queues and for comparing the contents of the field of the free packet descriptor queue control register with a threshold value, and for indicating a result of the comparison.

9. A method of localized managing of communication packets in a network element, each packet having a data packet and an associated packet descriptor, by way of a free packet descriptor queue, the method comprising the steps of:
identifying a packet descriptor that is not associated with an active packet queue, the packet descriptor associated with a pointer to a memory location at which the packet descriptor is located in the memory;
determining whether the identified packet descriptor is located in a first memory resource or in a second memory resource of the memory, the second memory resource having slower access performance than the first memory resource;
responsive to the identified packet descriptor being located in the first memory resource, updating a head packet descriptor index field in a free packet descriptor queue control register associated with the free packet descriptor queue to refer to the packet descriptor to be added; and
responsive to the identified packet descriptor being located in the second memory resource, updating a tail packet descriptor field in the free packet descriptor queue control register to refer to the packet descriptor to be added.

10. The method of claim 9, wherein the identifying step comprises:
receiving a return request from a host application, the return request including the pointer to the location in the memory of the identified packet descriptor.

11. The method of claim 9, further comprising:
receiving a pop request from a host application to remove a packet descriptor from the free descriptor queue;
outputting a pointer to the location in the memory of the packet descriptor to which the head packet descriptor index field of the free packet descriptor queue control register refers;
updating the head packet descriptor index field of the free packet descriptor queue control register to refer to a next packet descriptor in the free packet descriptor queue.

12. The method of claim 9, further comprising:
mapping the pointer of the identified packet descriptor to a packet descriptor index value;
responsive to the packet descriptor being located in the first memory resource:
reading the head packet descriptor index field in the free packet descriptor
queue control register to identify a current head packet descriptor that is currently at the head of the free packet descriptor queue; and
updating an entry in the linking memory, corresponding to the mapped packet descriptor index value of the identified packet descriptor, to point to the current head packet descriptor; and
responsive to the packet descriptor being located in the second memory resource:
reading the tail packet descriptor index field in the free packet descriptor queue control register to identify a current tail packet descriptor that is currently at the tail of the free packet descriptor queue; and
updating an entry in the linking memory, corresponding to the mapped packet descriptor index value of the identified current tail packet descriptor, to point to the mapped packet descriptor index value of the identified packet descriptor.

13. The method of claim 12, wherein the step of updating the head packet descriptor index field comprises writing the mapped packet descriptor index value to the head packet descriptor index field in the free packet descriptor queue control register;
and wherein the step of updating the tail packet descriptor index field comprises writing the mapped packet descriptor index value to the tail packet descriptor index field in the free packet descriptor queue control register.

14. The method of claim 13, further comprising:
receiving a pop request from a host application to remove a packet descriptor from the free packet descriptor queue;
unmapping the mapped packet descriptor index value stored in the head packet descriptor index field of the free packet descriptor queue control register to a pointer to the location in memory of the packet descriptor to be removed;
outputting the pointer to the location in memory of the packet descriptor to which the head packet descriptor index field of the free packet descriptor refers; and
updating the head packet descriptor index field of the free packet descriptor queue control register to store a descriptor index value corresponding to a next descriptor in the free packet descriptor queue.

15. The method of claim 9, wherein the identifying, determining, and updating steps are performed by logic circuitry in an integrated circuit;
wherein the first memory resource comprises memory realized in the integrated circuit;
and wherein the second memory resource comprises memory realized externally from the integrated circuit.

16. The method of claim 9, further comprising:
threshold logic for comparing the number of packet descriptors in the free packet descriptor queue with a threshold value; and
indicating a result of the comparison to a host application.

17. A network element, comprising:
network interface circuitry on an integrated circuit for coupling to a network;
an addressable memory for storing packet descriptors and data packets, each data packet associated with one of the packet descriptors, the addressable memory comprising:
an on-chip first memory resource realized in the integrated circuit and having memory locations within a system memory space; and
a second memory resource, the second memory resource having slower access performance relative to the processor than the first memory resource and external to the integrated circuit;
linking memory, realized in the on-chip memory, coupled to the queue manager, and having a plurality of entries, each entry mapped to one of a plurality of packet descriptor index values, each packet descriptor index value mapped to a memory address in the addressable memory, and each entry of the linking memory having a field for storing a next packet descriptor index value; and
a processor, coupled to the network interface circuitry and to the random access memory, the processor realized in an integrated circuit and comprising:
a queue manager, for localizing linking, coupled to the first memory resource and the second memory resource, comprising:
queue manager logic circuitry; and a free packet descriptor queue control register;

wherein the queue manager keeps base queue information in the first memory resource and adds a packet descriptor to a free packet descriptor queue associated with the free packet descriptor queue control register by performing a sequence of operations comprising:

receiving a return request including a pointer to the location in memory of the packet descriptor to be added;

determining whether the packet descriptor is located in the first memory resource or the second memory resource;

responsive to the packet descriptor being located in the first memory resource, updating a head packet descriptor field in the free packet descriptor queue control register to refer to the packet descriptor to be added; and responsive to the packet descriptor being located in the second memory resource, updating a tail packet descriptor field in the free packet descriptor queue control register to refer to the packet descriptor to be added.

18. The network element of claim 17, wherein the sequence of operations further comprises:

mapping the pointer to a packet descriptor index value;

responsive to the packet descriptor being located in the first memory resource:

reading the head packet descriptor field in the free packet descriptor queue control register to identify the packet descriptor currently at the head of the free packet descriptor queue; and updating an entry in the linking memory, corresponding to the mapped packet descriptor index value of the packet descriptor to be added, to point to the identified current head packet descriptor;

responsive to the packet descriptor being located in the second memory resource:

reading the tail packet descriptor field in the free packet descriptor queue control register to identify the packet descriptor currently at the tail of the free packet descriptor queue; and updating an entry in the linking memory, corresponding to the mapped packet descriptor index value of the identified current tail packet descriptor, to point to the mapped packet descriptor index value of the packet descriptor to be added;

wherein the operation of updating the head packet descriptor field comprises writing the mapped descriptor index value to the head packet descriptor field in the free packet descriptor queue control register;

and wherein the operation of updating the tail packet descriptor field comprises writing the mapped packet descriptor index value to the tail packet descriptor field in the free packet descriptor queue control register.

19. The network element of claim 18, wherein the queue manager removes a packet descriptor from the free packet descriptor queue by performing a sequence of operations compromising:

receiving a pop request;

unmapping the mapped packet descriptor index value stored in the head packet descriptor index field of the free packet descriptor queue control register to a pointer to the location in memory of the packet descriptor to be removed;

outputting the pointer to the location in memory of the packet descriptor to which the head packet descriptor index field of the free packet descriptor refers; and updating the head packet descriptor index field of the free packet descriptor queue control register to store a packet descriptor index value corresponding to a next packet descriptor in the free packet descriptor queue.

20. The network element of claim 17, wherein the queue manager removes a packet descriptor from the free descriptor queue by performing a sequence of operations comprising:

receiving a pop request;

outputting a pointer to the location in memory of the packet descriptor to which the head packet descriptor index field of the free packet descriptor queue control register refers;

updating the head packet descriptor index field of the free packet descriptor queue control register to refer to a next packet descriptor in the free packet descriptor queue.

* * * * *